United States Patent [19]

Lui

[11] Patent Number: 5,146,833
[45] Date of Patent: * Sep. 15, 1992

[54] COMPUTERIZED MUSIC DATA SYSTEM AND INPUT/OUT DEVICES USING RELATED RHYTHM CODING

[76] Inventor: Philip Y. F. Lui, 55 W. 16th St., New York, N.Y. 10011

[*] Notice: The portion of the term of this patent subsequent to Sep. 25, 2007 has been disclaimed.

[21] Appl. No.: 587,255

[22] Filed: Sep. 24, 1990

Related U.S. Application Data

[63] Continuation-in-part of Ser. No. 332,412, Mar. 30, 1989, Pat. No. 4,958,551, which is a continuation of Ser. No. 44,839, Apr. 30, 1987, abandoned.

[51] Int. Cl.⁵ .................... G09B 15/04; G10G 3/04; G10H 7/00
[52] U.S. Cl. ................... 84/462; 84/477 R; 84/484; 84/611; 84/DIG. 12
[58] Field of Search .................. 84/609-614, 84/634-643, 645, 649-652, 666-669, 462, 477 R, 478, 484, DIG. 12

[56] References Cited

U.S. PATENT DOCUMENTS 4,742,748  5/1988  Tateishi .................... 84/DIG. 12

Primary Examiner—Stanley J. Witkowski
Attorney, Agent, or Firm—Leighton K. Chong

[57] ABSTRACT

A computerized musical instrument system has a processing system for converting multiple modes of music data input into relative rhythm coded data in the format of pitch codes and relative rhythm codes for designating respective types of rhythm elements, including the pitches, as they occur in the beats or other basic music intervals of a music piece. The relative rhythm codes represent the relative proportions by which the designated rhythm elements divide each beat. In a relative rhythm coding mode, pitch and rhythm data are entered via a keyboard and relative rhythm code and control code keys. The music data may also be input in the form of MIDI formatted data, audio or digital sound input, real-time performance (keypress) data, or optically scanned data from printed music notation. The instrument system can provide various forms of outputs including synthesized sound, a display or music notation, stored music data, printed output, and related audio and/or image effects.

20 Claims, 25 Drawing Sheets

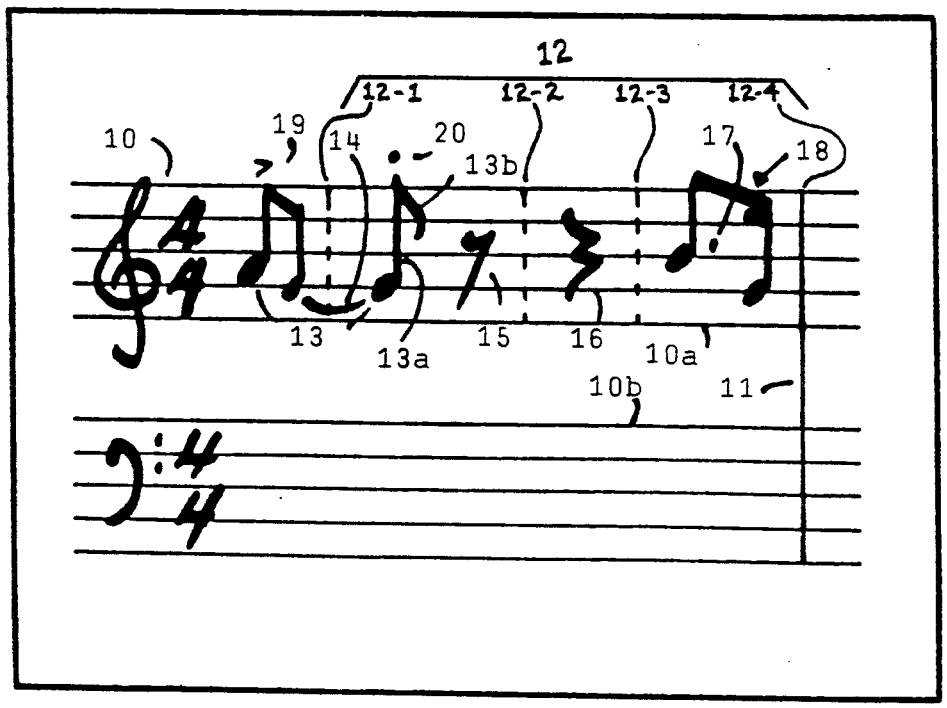

| RHYTHM TYPES: | PITCH | REST | TIE | DOT |
|---|---|---|---|---|
| MAIN DIVISION: | N | R | T | D |
| SUB DIVISION: | n | r | t | d |
| TERMINATOR | / | | | |
| AUTO TERMINATOR | A | | | |
| BEAT MULTIPLIERS: | 1x, 2x, 3x | | | |

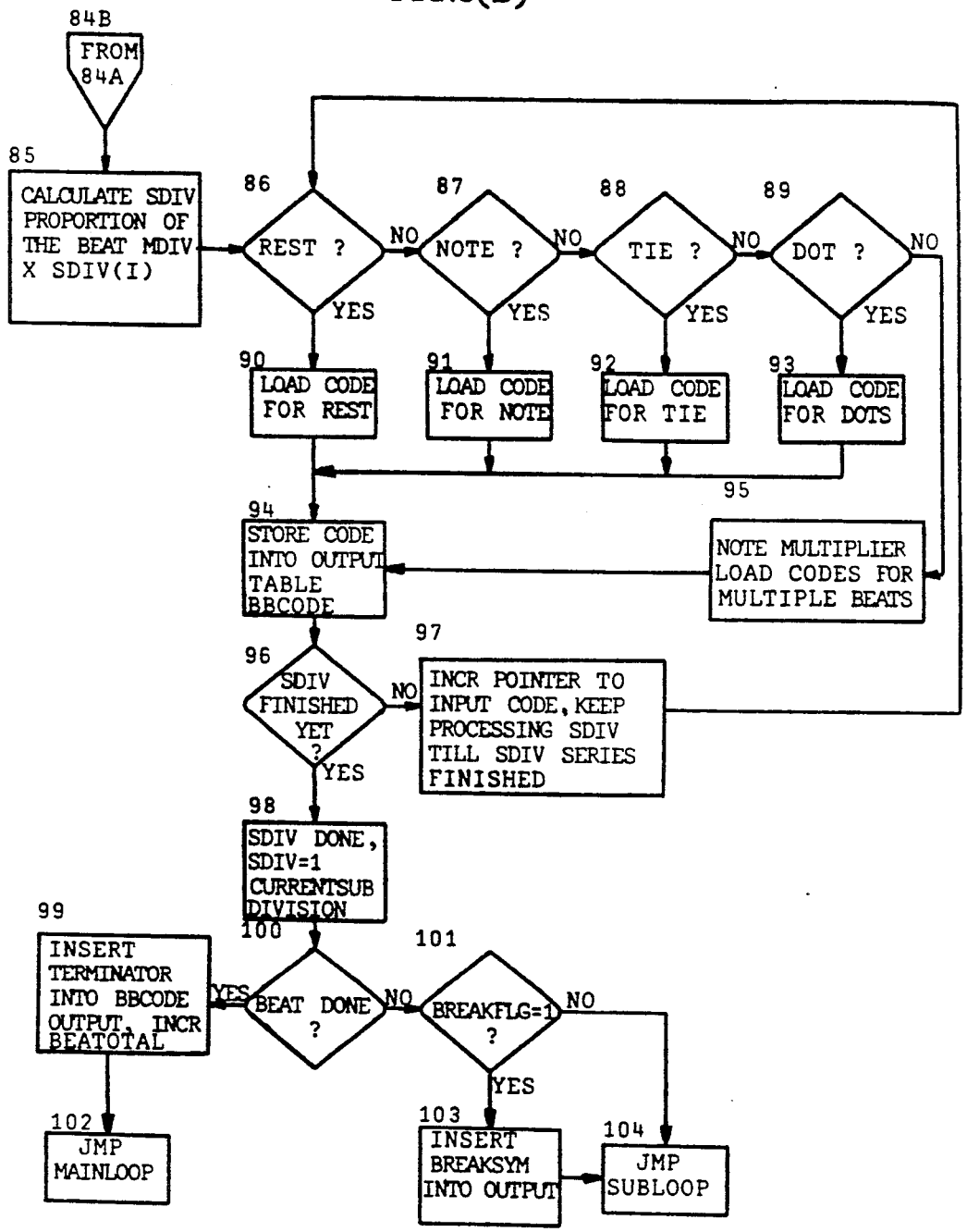

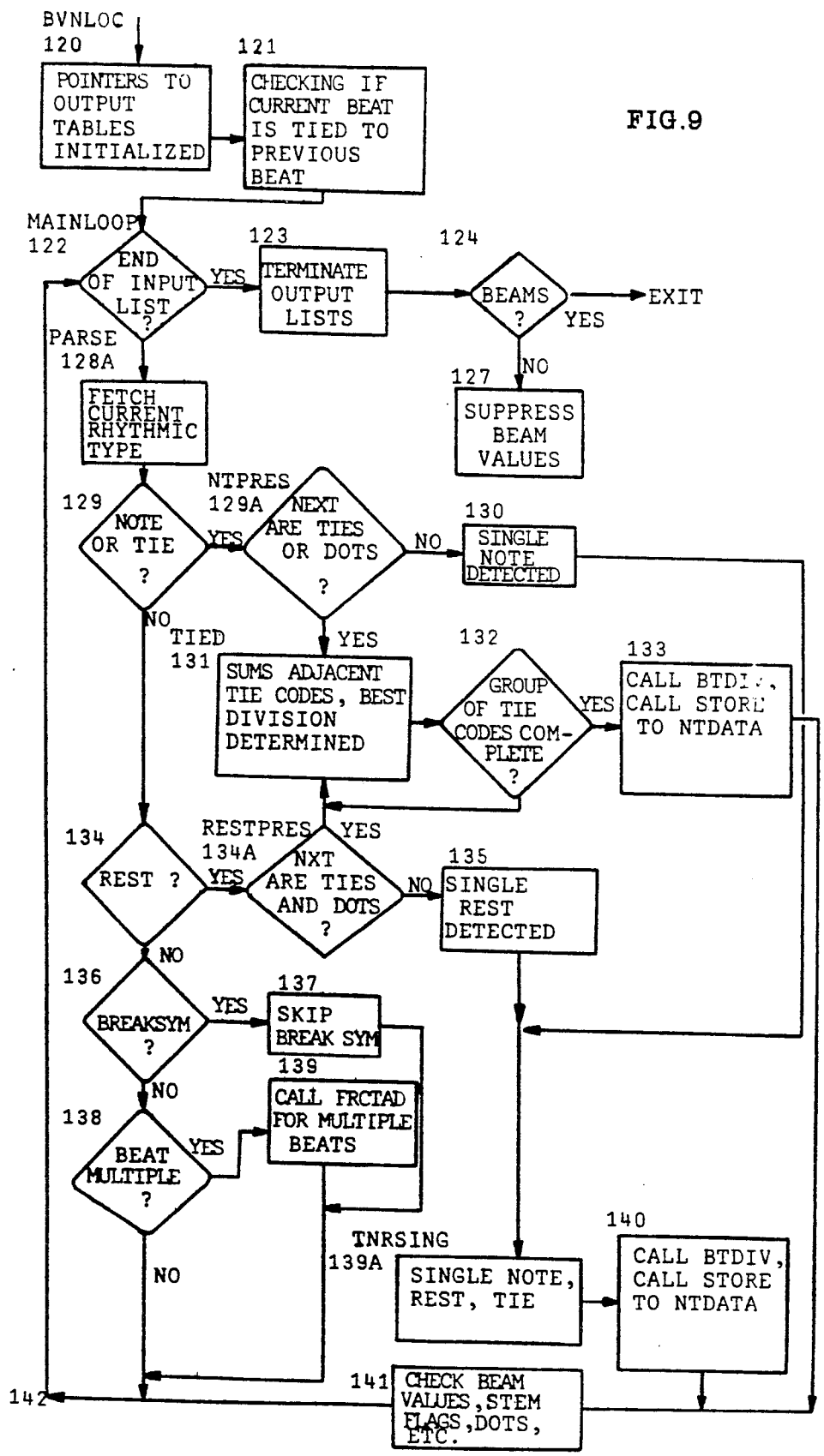

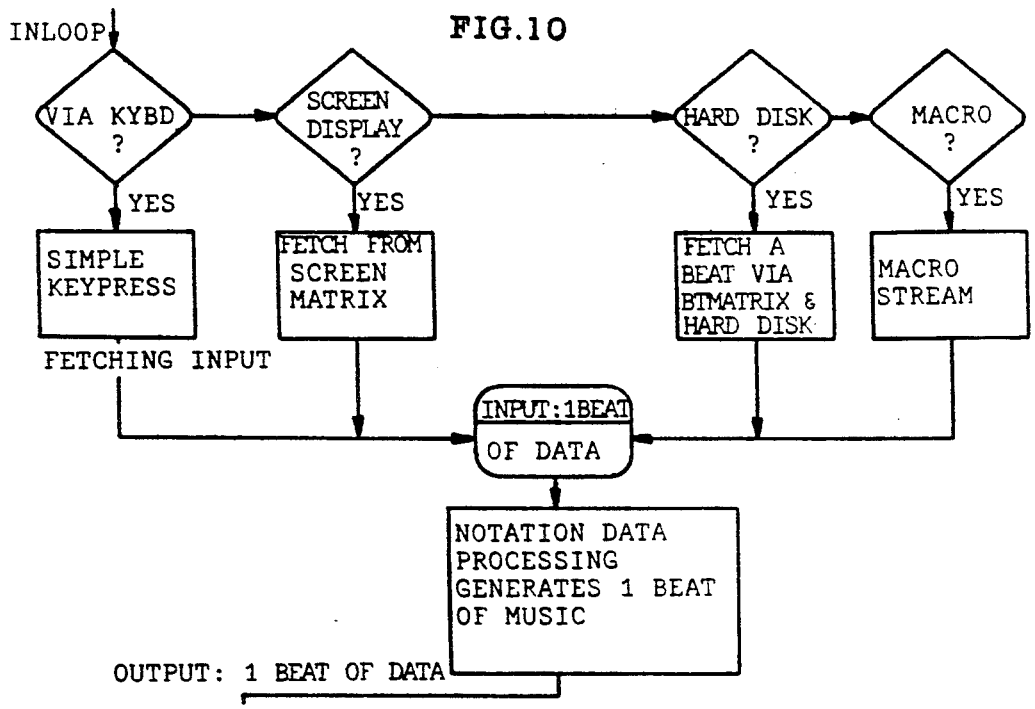
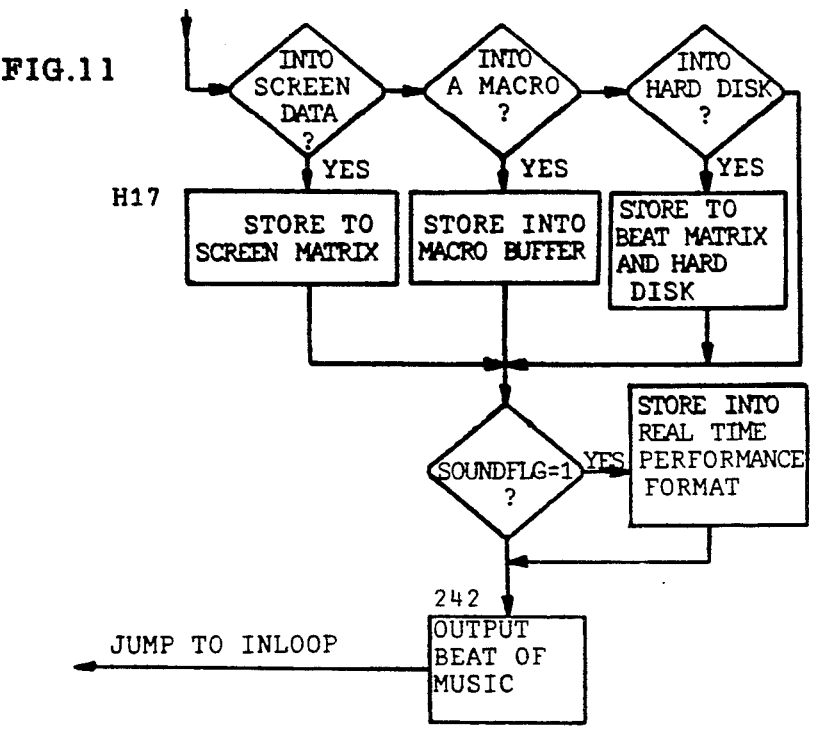

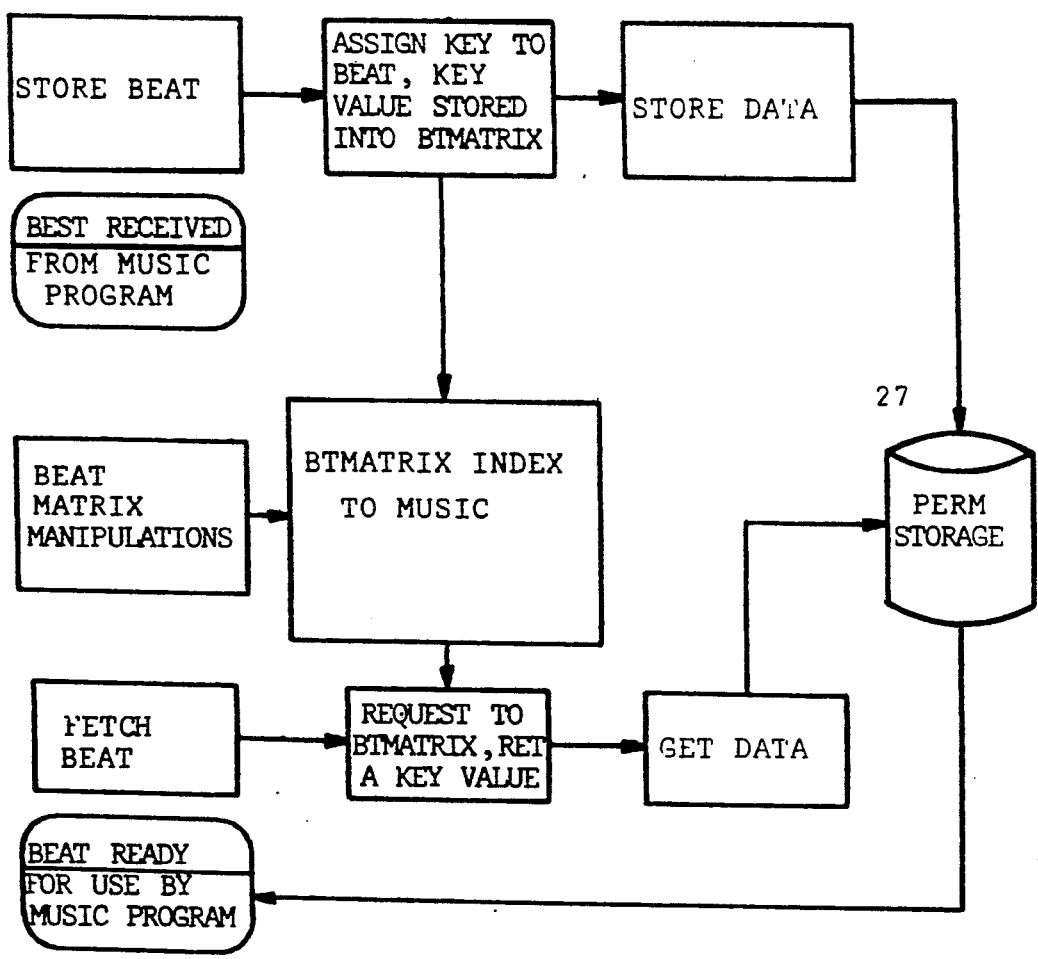
FIG.12 BEAT STORAGE RETRIEVAL

BEAT DURATION: 1/4 NOTE IN 4/4 TIME

| RHYTHM CODE: | N | s | | n | T | / |
|---|---|---|---|---|---|---|
| BBCODE: | 8N | 8T | 8T | 8N | 2T | / |
| NTDATA: | | | | | | |
| NOTE/REST | Note | | | Note | Note | |
| STEMLEN | DEF. | DEF. | DEF. | DEF. | DEF. | |
| STEMDIR | UP | UP | UP | UP | UP | |
| NO.BEAMS | 2 | | | 3 | 1 | |
| BEAMTILT | DEF | DEF | DEF | DEF | | |
| TIE | | | | Yes | Yes | |
| DOT | | Yes | | | | |

FIG.14

| | | | | |
|---|---|---|---|---|
| KEYCMD | | | | |
| Simple Code rhythm | 8 | 8 | 8 | 8 |
| Pitch name | C | D | E | F |
| Octave number | 3 | 3 | 3 | 3 |
| Pitch x origin | p1x | p2x | p3x | p4x |
| Pitch y origin | p1y | p2y | p3y | p4y |
| Accidental name | sh | - | fl | - |
| Accidental x origin | a1x | a2x | a3x | a4x |
| Accidental y origin | a1y | a2y | a3y | a4y |
| | | | | |
| BCODI | | | | |
| Bbcode rhythm code | N | N | N | N |
| proportion of Main Beat | 4 | 4 | 4 | 4 |
| | | | | |
| BVNLOC | | | | |
| notehead symbol name | 1/4N | 1/4N | 1/4N | 1/4N |
|    Btdiv | | | | |
|     note symbol address | N | N | N | N |
|    Store | | | | |
|     note X origin | o1x | o2x | o3x | o4x |
|     note Y origin | o1y | o2y | o3y | o4y |
| Point Px | Px1 | Px2 | Px3 | Px4 |
| Point Py | Py1 | Py2 | Py3 | Py4 |
| Accidentals symbol name | sh | - | fl | - |
| Accidental X org | shX | - | flX | - |
| Accidental Y org | shY | - | flY | - |
| No. of dots | - | - | - | - |
| Stemlen | def | def | def | def |
| Flags | - | - | - | - |
| Stemdir | up | up | up | up |
| No. of beams | 2 | 2 | 2 | 2 |
| Tiltval | def | def | def | def |
| Tie | - | - | - | - |
| | | | | |
| BMRHY | | | | |
| Point Rx | 1Rx | 2Rx | 3Rx | 4Rx |
| Point Ry | 1Ry | 2Ry | 3Ry | 4Ry |
| Point Qx | 1Qx | 2Qx | 3Qx | 4Qx |
| Point Qy | 1Qy | 2Qy | 3Qy | 4Qy |
| | | | | |
| LV2DRW | | | | |
| Outputs vector tables, Ntdata | | | | |

NOTATION DISPLAY:

FIG.15(a)
BEAT DURATION: 1/4 NOTE IN 4/4 TIME

| RHYTHM CODE: | N | N | N | N | / |
|---|---|---|---|---|---|
| BBCODE: | 4N | 4N | 4N | 4N | / |
| NTDATA: | | | | | |
| NOTE/REST | Note | Note | Note | Note | |
| STEMLEN | DEF. | DEF. | DEF. | DEF. | |
| STEMDIR | UP | UP | UP | UP | |
| NO.BEAMS | 2 | 2 | 2 | 2 | |
| BEAMTILT | DEF | DEF | DEF | DEF | |
| TIE | | | | | |
| DOT | | | | | |

FIG.15(b)
BEAT DURATION: 1/4 NOTE IN 4/4TIME

| RHYTHM CODE: | N | n | N | N | / |
|---|---|---|---|---|---|
| BBCODE: | 6N | 6N | 3N | 3N | / |
| NTDATA: | | | | | |
| NOTE/REST | Note | Note | Note | Note | |
| STEMLEN | DEF. | DEF. | DEF. | DEF. | |
| STEMDIR | UP | UP | UP | UP | |
| NO.BEAMS | 2 | 2 | 1 | 1 | |
| BEAMTILT | DEF | DEF | DEF | DEF | |
| TIE | | | | | |
| DOT | | | | | |

FIG.15(c)
BEAT DURATION: 1/4 NOTE IN 4/4 TIME

| RHYTHM CODE: | N | R | n | N | n | t | R | / |
|---|---|---|---|---|---|---|---|---|
| BBCODE: | 4N | 8R | 8N | 12N | 12N | 12T | 4R | / |
| NTDATA: | | | | | | | | |
| NOTE/REST | Note | 1/32Rst | Note | Note | Note | Note | 1/16Rst | |
| STEMLEN | DEF. | DEF. | DEF. | DEF. | DEF. | DEF. | DEF. | |
| STEMDIR | UP | UP | UP | UP | UP | UP | UP | |
| NO.BEAMS | 2 | 3 | 3 | 3 | 3 | 3 | 2 | |
| BEAMTILT | DEF | DEF | DEF | DEF | DEF | DEF | DEF | |
| TIE | | | | | | | | |
| DOT | | | | | | Yes | Yes | |

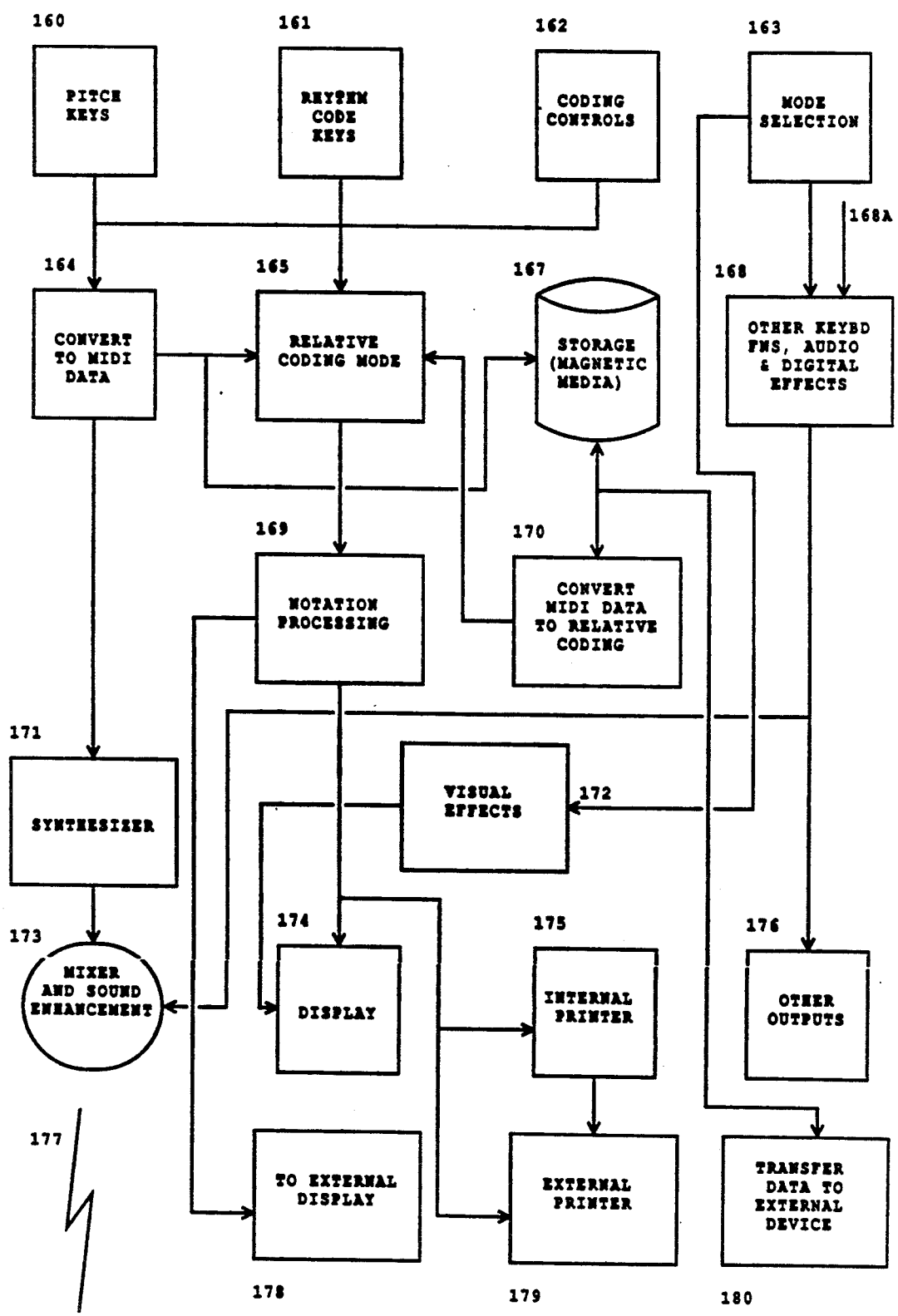
FIG. 16A (MUSICAL INSTRUMENT USING RELATIVE RHYTHM & PITCH CODES-INTERNAL FLOW)

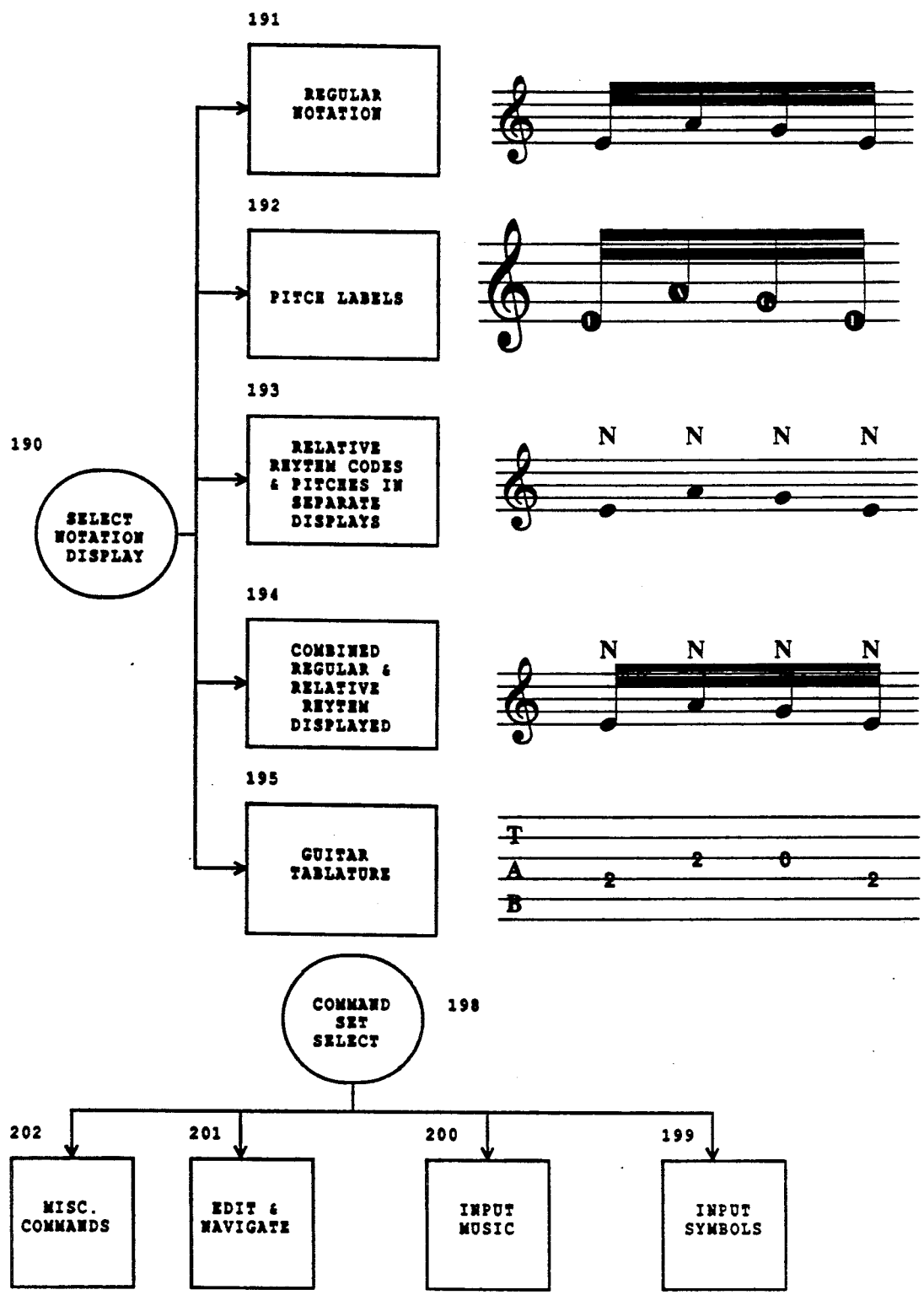
FIG. 16B (DISPLAY & COMMAND MODE SELECT)

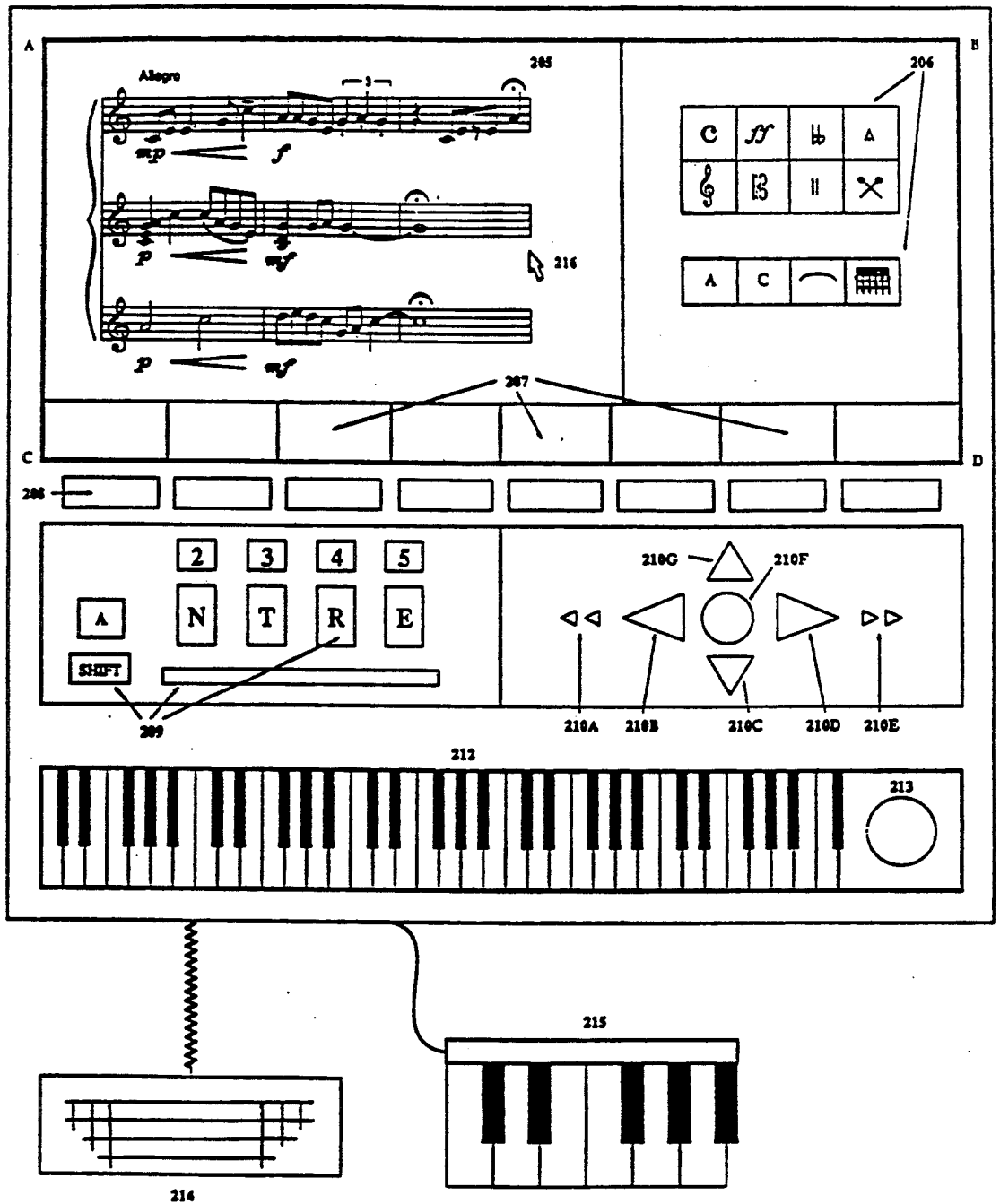
FIG. 16C - INSTRUMENT USING RELATIVE RHYTHM AND PITCH CODES - EXTERNAL INTERFACE

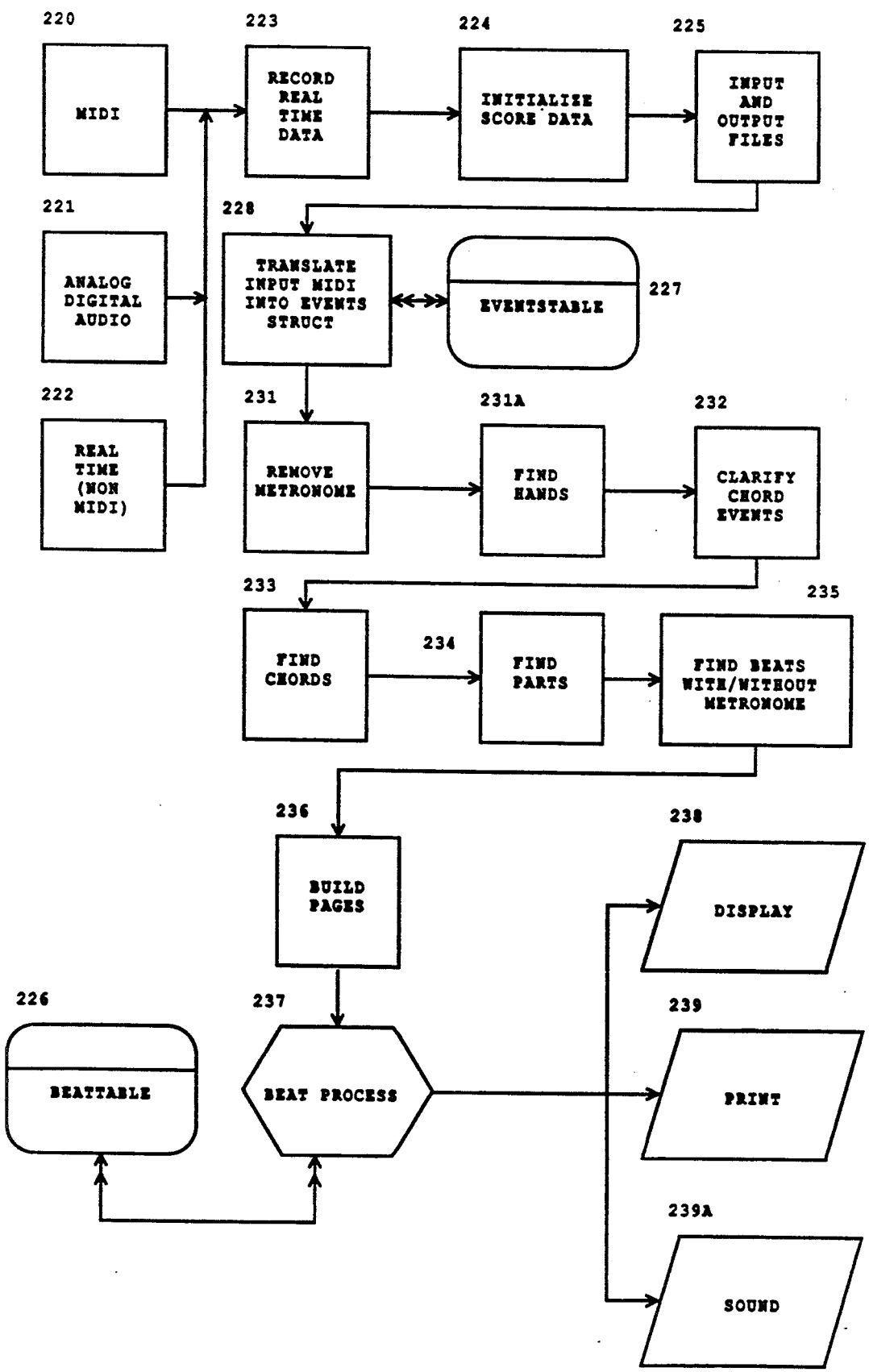
FIG. 17A (FIXED TIME DATA TO RELATIVE RHYTHM CODES & NOTATION CONVERSION)

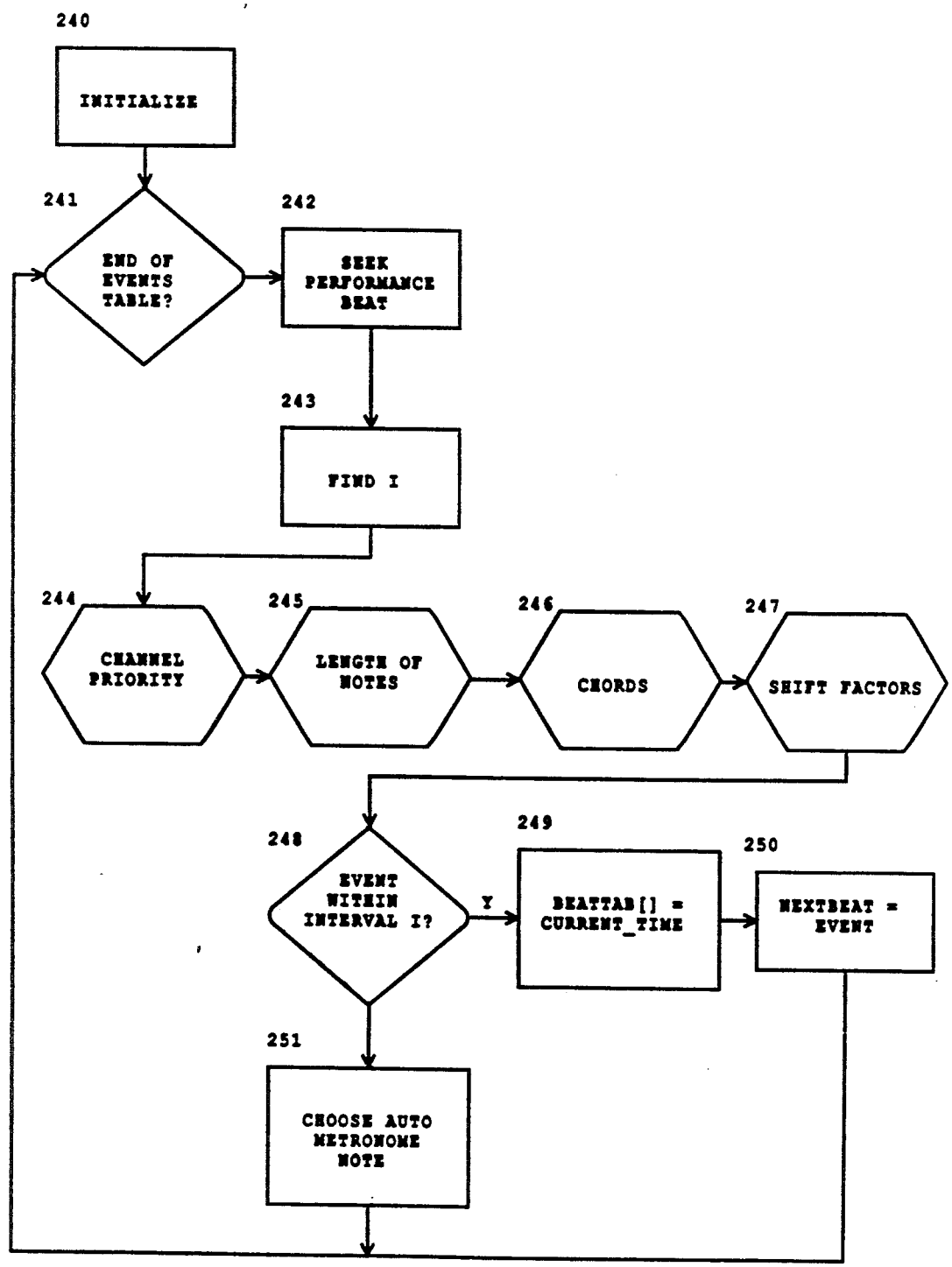
FIG. 17B (FINDING BEATS IN FIXED TIME DATA)

FIG. 17C (BUILDING PAGES)

252 COUNT EVENTS WITHIN CURRENT BEAT

253 STORE EVENT LENGTHS ↔ 252A EVENTLENGTHS

254 CONVERT LENGTHS TO PROPORTIONS

255 MATCH PR AGAINST PROPLIST LIBRARY → 256 CALL GETRHYCODES() → 257 OUTPUT: RELATIVE RHYTHM CODES

258 STORE TO STAFF

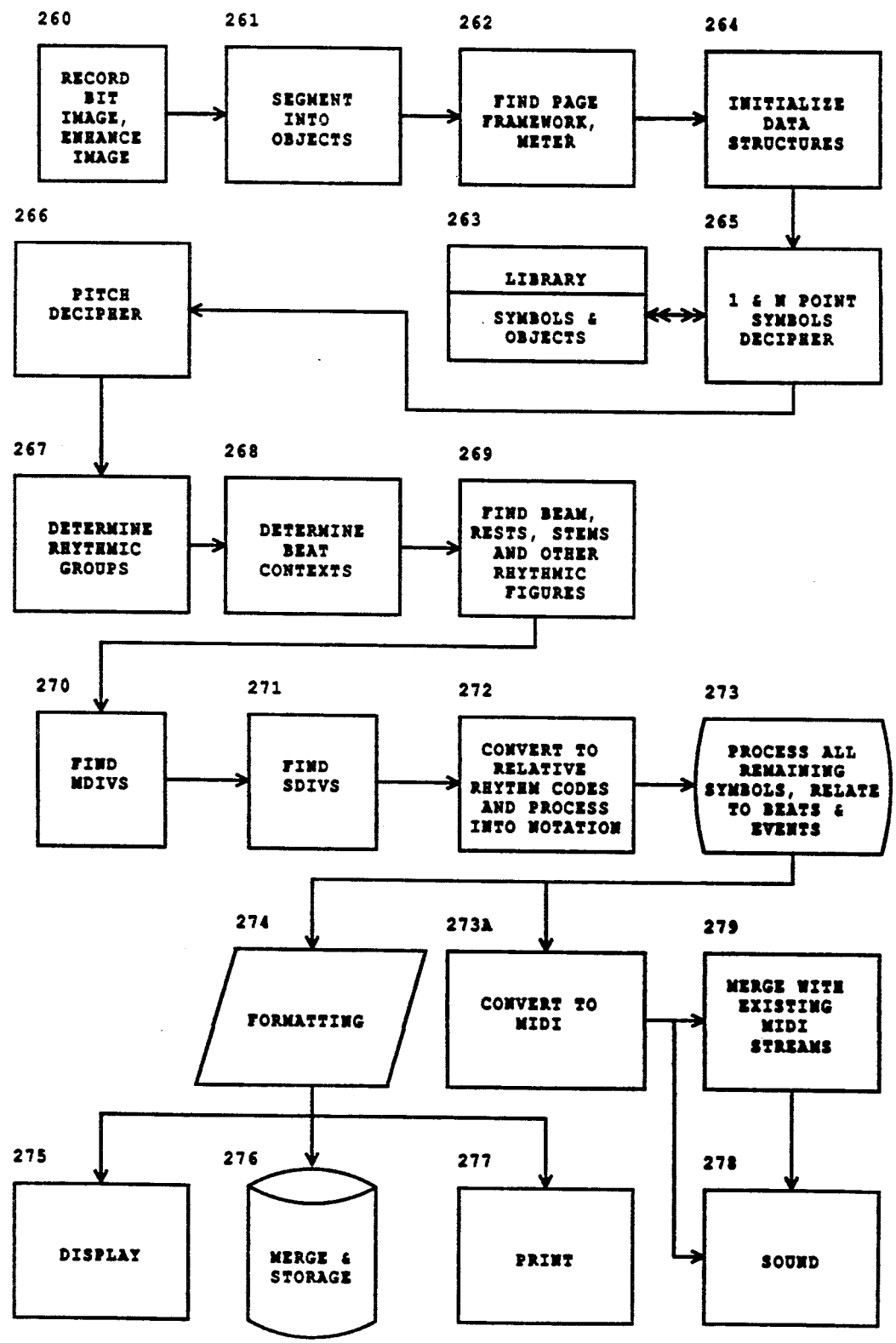
FIG. 18A (SCANNING MUSIC TO RHYTHM CODES & NOTATION)

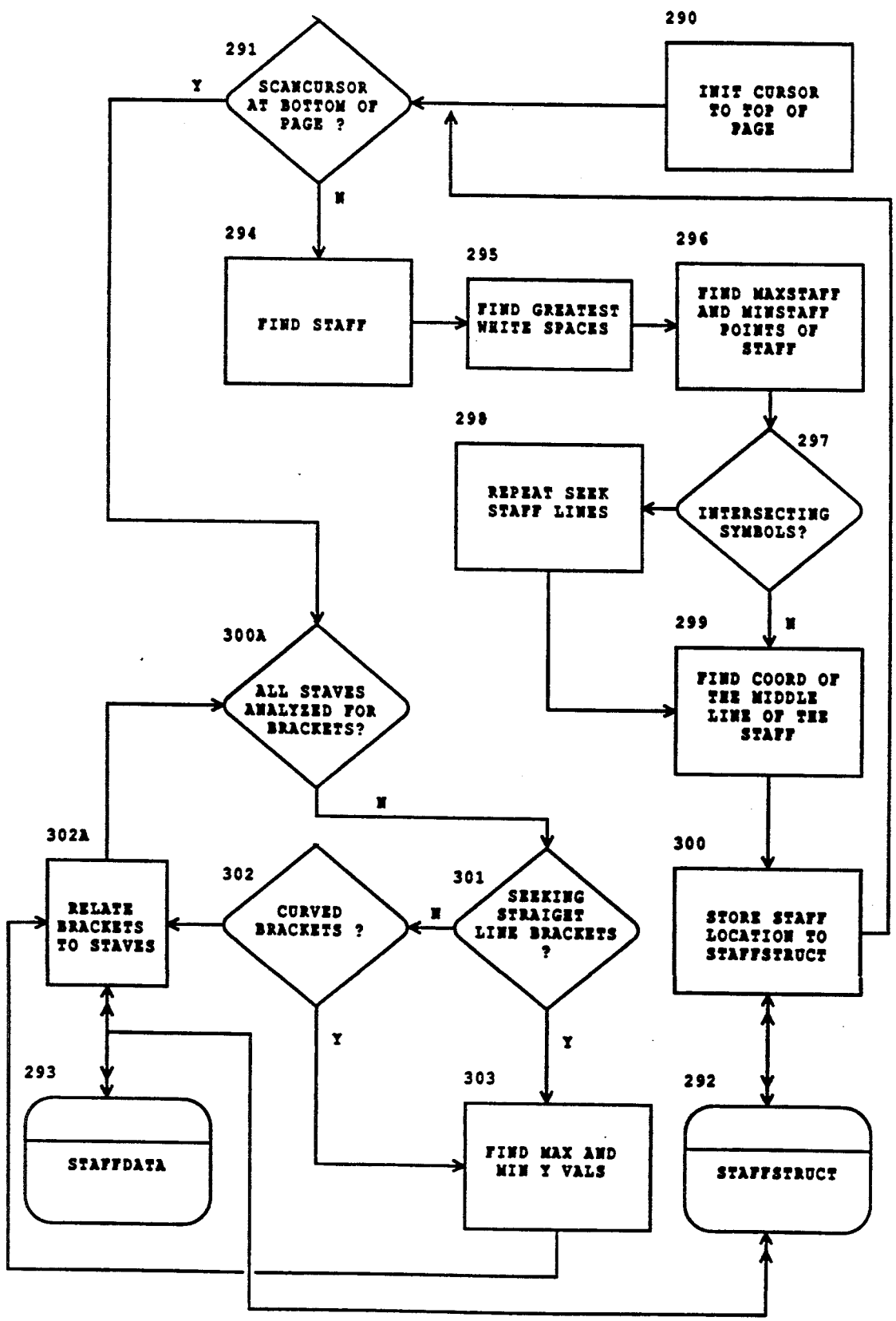
FIG. 18B (SCANNING - FINDING STAFF/SYSTEM LOCATIONS)

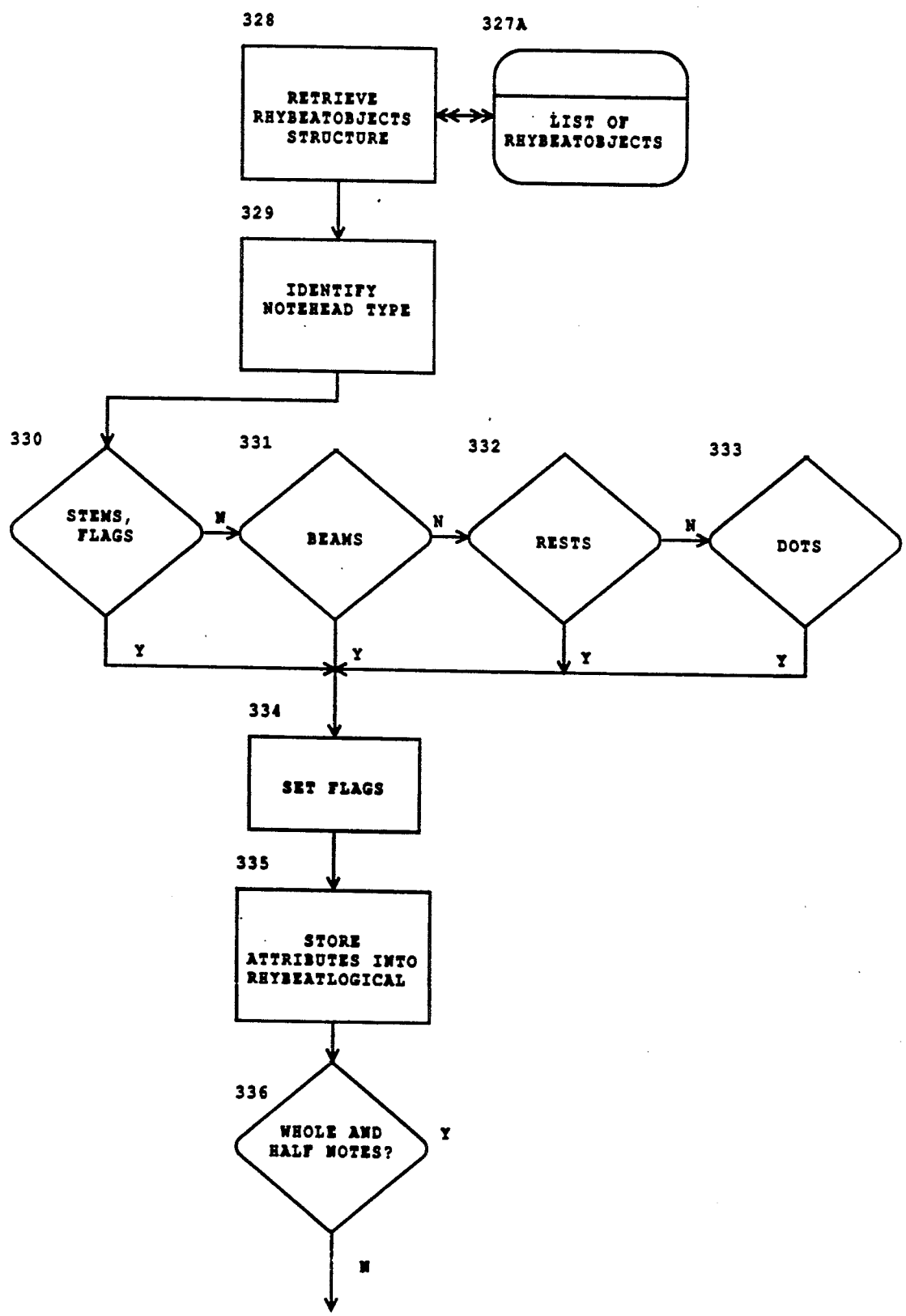
FIG. 18C-a (SCANNING - RHYTHM & PITCH ANALYSIS)

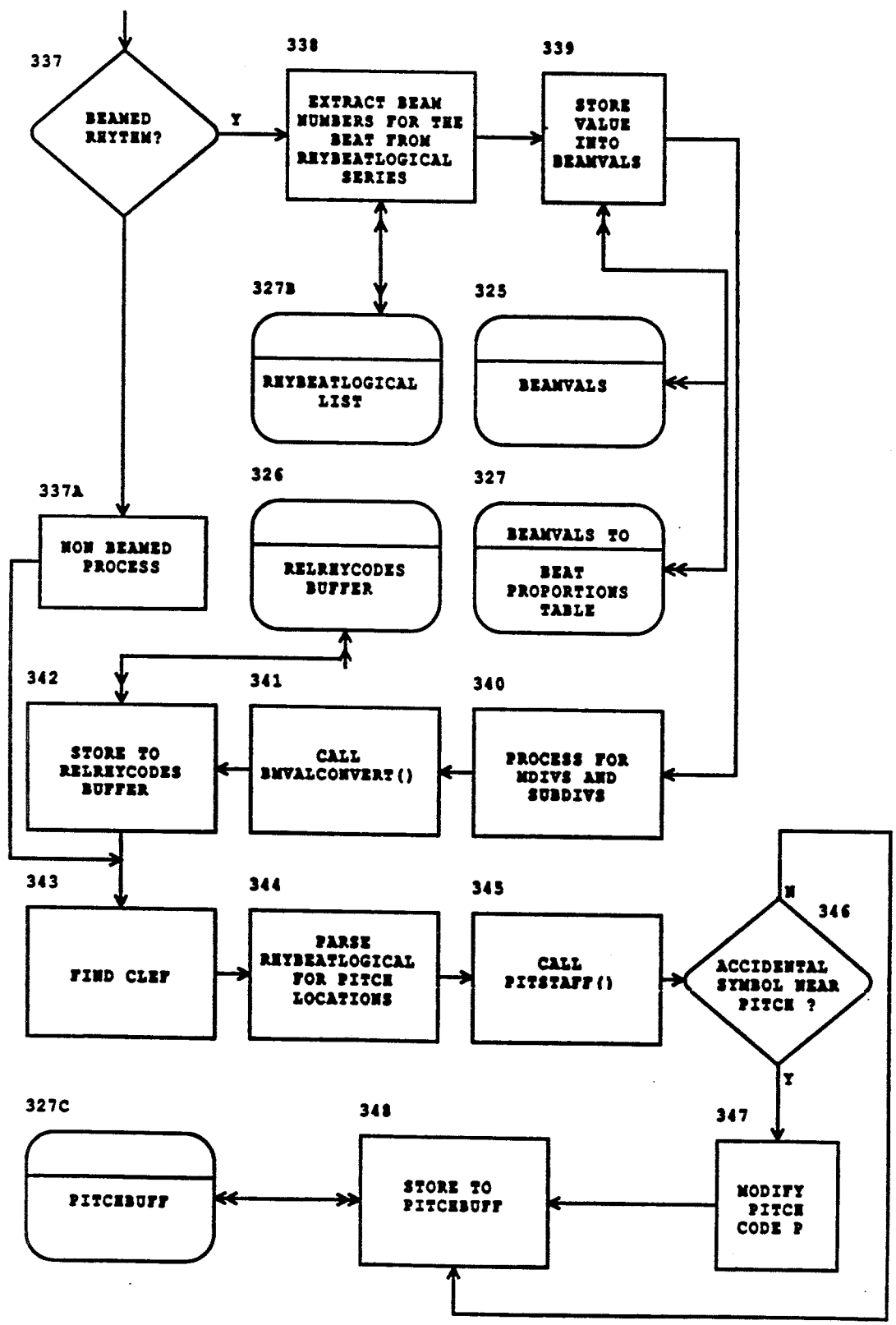

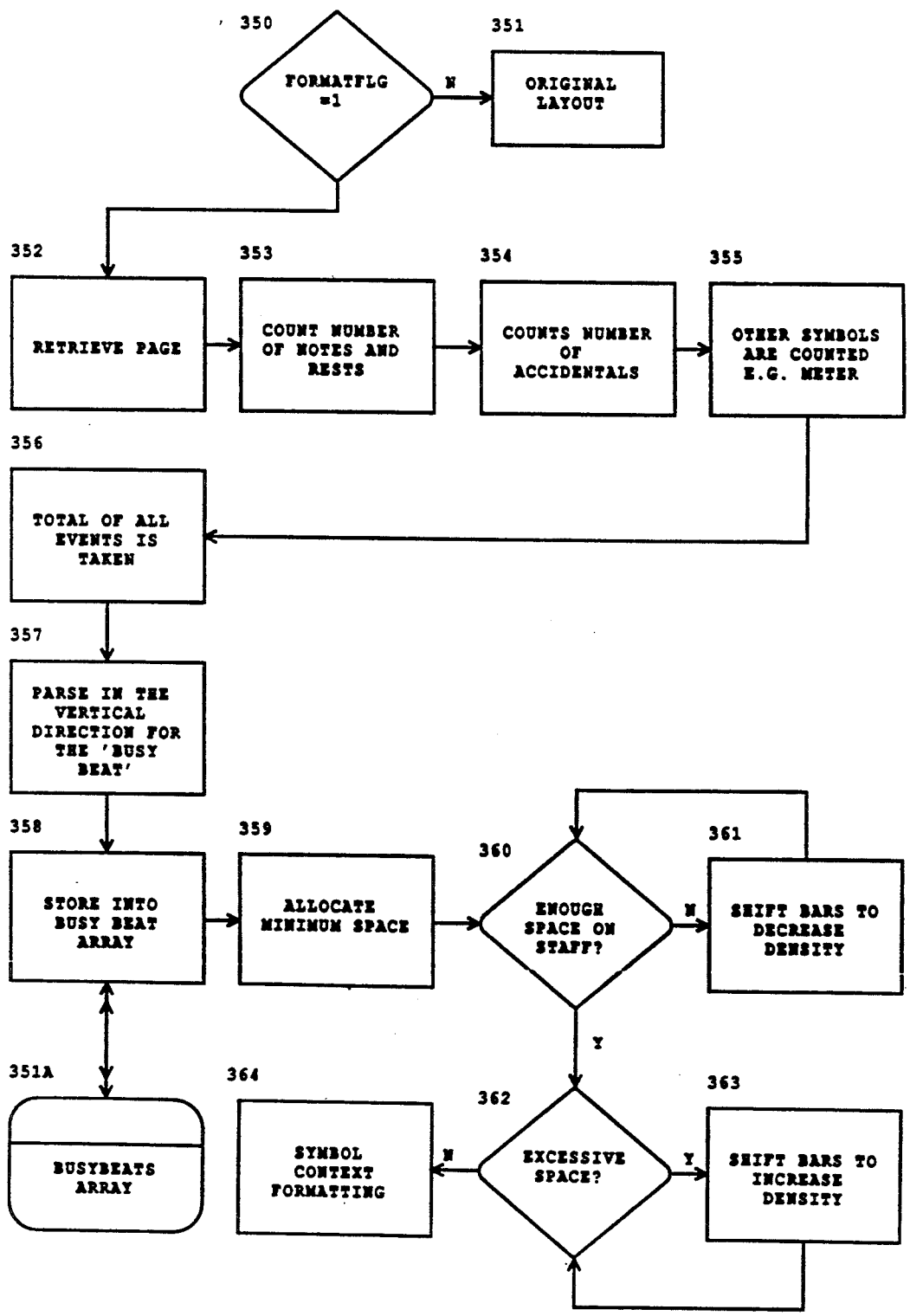
FIG. 18D (SCANNING - FORMATTING)

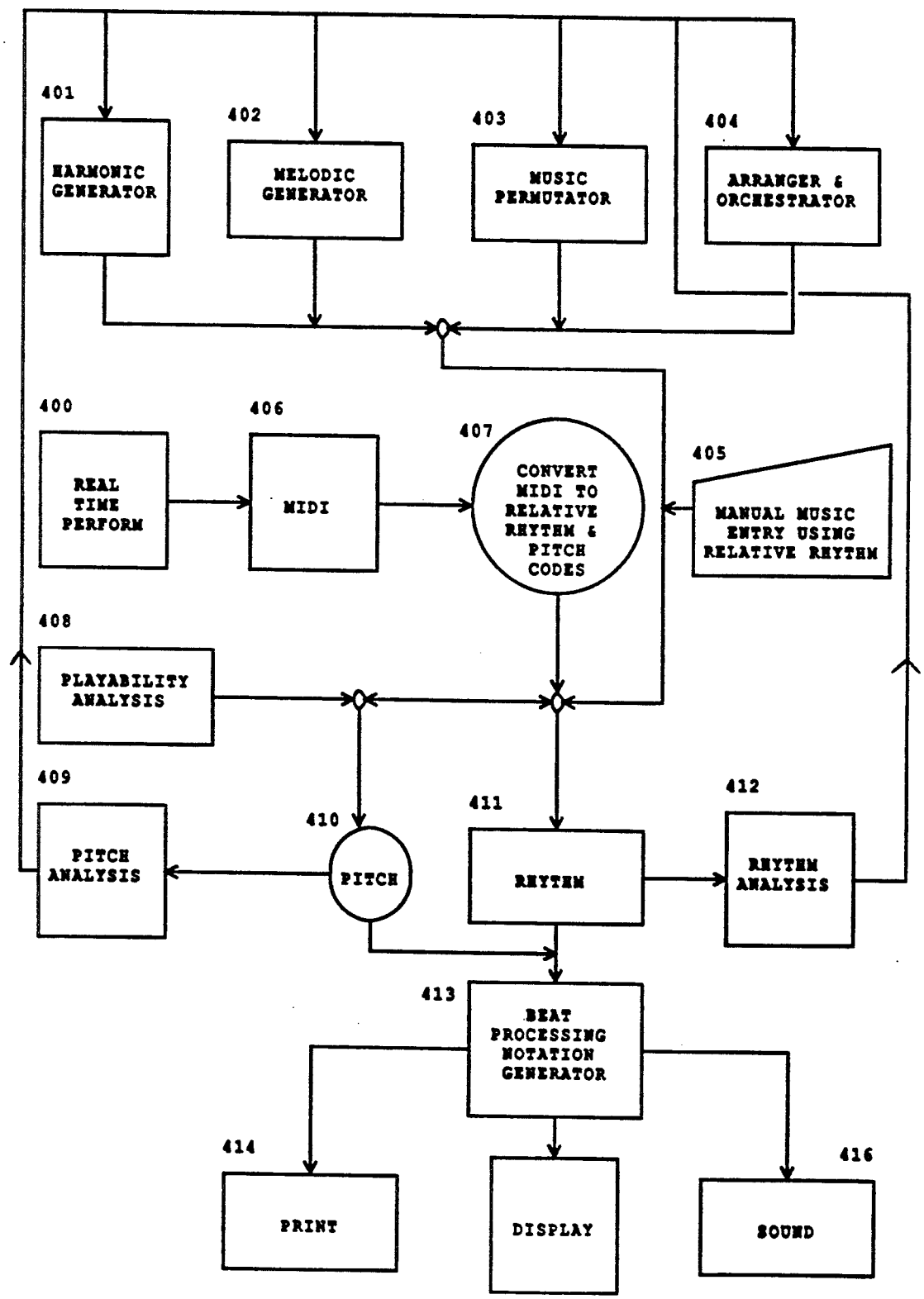
FIG.19 (MUSIC APPLICATIONS USING RELATIVE RHYTHM CODES & PITCH STREAMS)

COMPUTERIZED MUSIC DATA SYSTEM AND INPUT/OUT DEVICES USING RELATED RHYTHM CODING

This is a continuation-in-part of U.S. application Ser. No. 07/332,412, filed Mar. 30, 1989, and issued as U.S. Pat. No. 4,958,551, which was a continuation of U.S. application Ser. No. 07/044,839, filed Apr. 30, 1987, now abandoned.

FIELD OF THE INVENTION

The invention relates to a computerized music notation system in which pitch codes are entered on an instrument keyboard and rhythm codes are entered on a control keyboard as data sets independent of each other. The pitches and rhythm codes are then processed together by a computer program in order to produce integrated music data for storage, modification, translation, display, printed music notation, synthesized music or other forms of output.

BACKGROUND OF THE INVENTION

Music notation has traditionally been written out by hand and entered in an automated system for publication as typeset or printed sheets. The manual process of handwriting, revising, and/or transcribing music notation can be very laborious for the music composer. For the music publisher, the conversion of handwritten notation into an automated typesetting or printing system requires the manual inputting of data, and only a limited capability exists for compositional modifications. The data generally must be reentered if the rhythm of the music is substantively changed.

Micro computers have been applied to music composition for digital processing of music data. Such computer systems allow a composer to compose on a keyboard and to store, manipulate, and output the data as synthesized music or as printed music notation. These systems have been generally of two types, i.e. realtime coding and non-realtime coding. In realtime coding systems, music is entered on an instrument keyboard, such as a piano-type keyboard, with exactly the timing and rhythm as it is intended to be played. The key inputs are analyzed by computer for their indicated pitches and the actual time durations and rhythms by which they are pressed on the keyboard in order to derive the proper notation. In non-realtime systems, the pitches are entered as separate data from their durations and rhythms.

As an example of a realtime system, Davis et al. U.S. Pat. No. 3,926,088 employs an organ keyboard on which an operator plays the pitch keys and a foot pedal which is pressed to indicate the start of each measure. The pitch keys in each measure are then processed into music notation according to the time durations and rhythmical ordering in which they are pressed. Such realtime systems have the disadvantage that the music must be played through with metronomic accuracy in order for the durations and ordering of the pitches to be analyzed correctly. The necessity of entering the pitch keys exactly as they are to be played severely limits the ability of the composer to compose or modify the music at the keyboard. Further, such systems have built-in limitations in discriminating notes of short durations or of complex rhythms.

In non-realtime systems, pitches are entered by selecting from an array of designated pitch keys, and the note durations associated with the pitches are entered separately by selecting from a prescribed set of binary fractions, i.e. halfs, quarters, eighths, sixteenths, etc., in order to define the desired music notes. Other rhythmical types, such as ties (continued notes) and rests (pauses), are entered in a similar manner as the pitches. For example, Rauchi U.S. Pat. No. 4,307,645 and Ejiri et al. U.S. Pat. No. 4,215,343 disclose non-realtime coding systems having keys for standard notes, ties, and rests in binary fractions. Namiki et al. U.S. Pat. No. 4,202,235 employs note duration keys in integer multiples of 1/16th intervals.

Such non-realtime systems are cumbersome to use since a specific duration is assigned in a fixed relationship to each pitch key. These systems have little capability of modifying the music notation into different time signatures without reentering the data. Moreover, the same rhythm representations in some cases may be played with different actual time durations, since conventional music notation uses binary note symbols whereas more complex rhythm structures may be desired. The assignment of a fixed binary symbol to each pitch in conventional systems would therefore result in music data that did not represent actual time durations for a wide range of rhythms, and would limit the usefulness of the data, for example, for playing the music on a synthesizer.

SUMMARY OF THE INVENTION

In view of the aforementioned limitations of conventional systems, it is a principal object of the present invention to provide a computerized system in which pitch data and relative rhythm data are entered as data sets independent of each other, and then are processed together to generate an integrated music data output. A central feature of the invention is that the rhythm data represent the relative proportions by which the pitches, rests, ties, and other rhythm types divide a basic music interval, such as the main beat, so that their relative proportions remain specified even if the time signature of the beat is changed. It is a further object that a screen display, printed music notation and other forms of output can be generated from the pitch and rhythm data responsive to a wide range of selected compositional parameters, and can be modified or changed by computer processing without having to reenter the original data.

In accordance with the invention, a computerized music notation system comprises: (a) first entry means for entering pitch data representing a series of tone pitches; (b) second entry means for entering relative rhythm data representing the relative proportions by which selected rhythm types, including the pitches as one rhythm type, divide a basic music interval, such as a beat of the music, wherein the rhythm data includes at least a first rhythm code indicating each main division of the beat by a pitch and a demarcator code delimiting each beat; (c) processing means for processing the rhythm data with the pitch data, including (1) means for assigning relative beat division values to the rhythm codes of each beat in accordance with beat divisions indicated by the relative rhythm data, (2) means for selecting a fixed duration value assigned to each beat, (3) means for calculating fixed beat division values for the rhythm codes in each beat in accordance with the fixed duration value assigned to the beat and the relative beat division values assigned to the rhythm codes, and (4) means for linking the fixed beat division values for the rhythm codes to corresponding ones of the series of pitches; and (d) output means for providing an output of the pitches linked to their corresponding fixed beat division values.

The above-described basic structure of the invention provides for the pitch data to be entered independently of the corresponding relative rhythm data, and the two sets of data are processed together to assign fixed duration values to the pitches according to a selected time signature. In the preferred implementation of the invention, the main beat of the music is the basic duration interval, i.e. the preferred system is beat oriented. In standard music notation, the time signature indicates the number of beats per measure and the note duration of each beat, e.g. half-note per beat, quarter-note per beat, etc. The system according to the present invention processes the pitch data and the relative rhythm data together by assigning note duration values to the pitches calculated according to their relative proportions within a beat and the note duration per beat.

The relative rhythm coding of the invention also includes rhythm codes for other rhythm types, i.e. ties, rests, and dots, as well as subdivision codes for designating subdivisions of any main division of a beat by the rhythm types. The codes are selected to correspond to conventional types of rhythm notations, so that entry and interpretation of the rhythm codes parallels conventional music notation for the convenience of the user. The rhythm codes constitute a relatively small code set, yet they allow expression of music notation to a high degree of rhythmical complexity. The main division and subdivision codes permit the user to encode note durations other than conventional binary fractions, e.g. 1/3rd, 1/5th, 1/6th 1/7th notes, etc.

If the user desires to have music notation translated into a different time signature, the original pitch and relative rhythm data can be retrieved from storage, and the note durations of the pitches and other rhythm types can be recomputed for the new time signature. Since the relative rhythm codes represent the intended proportions by which the rhythm types divide each beat, the same rhythm codes can be used both to generate music notation using standard binary note symbols, and also as data to a synthesizer representing the actual durations of the notes to be played. The key of music can also be selected as a system parameter, and the corresponding pitch names and the proper locations and notehead styles of the notes on a musical staff are defined during processing of the pitch data in the selected key.

The preferred system configuration of the invention includes an instrument keyboard for entering pitch data by pressing corresponding pitch keys, a control keyboard for entering the relative rhythm codes, as well as command codes for selecting the parameters of and operating the system, a computer for executing the program for processing the pitch and rhythm data, and associated output devices such as a display screen, a printer, a music synthesizer, and/or a data storage device. Pitch and relative rhythm data for the system can also be derived by computer processing in reverse sequence to that described above, from input obtained through digital scanning and feature recognition of original music notation.

Other features of the computerized music notation system of the invention include program routines for deriving ledger lines, staff notations, stems, flags, beams, dotted notes, notehead designs, articulation marks, line, measure, beat, and note spacings, and other aspects of fully featured music notation. The invention is advantageous for a wide range of applications, e.g. composition, music synthesis, printing of music notation, computerized music archiving, and performing high speed retrieval, regeneration, and modification of music data under computer control.

BRIEF DESCRIPTION OF THE DRAWINGS

The above-mentioned objects, purposes, features, and applications of the invention are described in further detail below in conjunction with the drawings, of which:

FIG. 1 illustrates an example of conventional music notation;

FIG. 2 is a chart depicting conventional note symbols for pitches and other rhythm types;

FIGS. 8(a) and 8(b) are flow diagrams of the BCODI subroutine of LV1DRW for converting the input rhythm codes into rhythm data with assigned relative beat division values;

FIG. 9 is a flow diagram of the BVNLOC subroutine of LV1DRW for determining notation parameters for the output of fully featured music notation;

FIGS. 10 and 11 are schematic diagrams of input and output functions for a beat of music;

FIG. 12 illustrates storage and retrieval of music data to or from permanent storage in beat units;

FIG. 14 is a chart of some attributes of notation parameters and output data generated by the notation processing program of the invention;

FIGS. 15(a), 15(b), 15(c), and 15(d) show some examples of the conversion of rhythm code sequences to output notation in the preferred system of the invention;

FIG. 16(a) shows the internal flow for a multi-function musical instrument system incorporating relative rhythm and pitch coding with typical instrument functions, FIG. 16(b) shows command selections and typical displays for the instrument system, and FIG. 16(c) illustrates a preferred form of external configuration and interfaces for the instrument system;

FIG. 17(a) is a flow diagram for a conversion program for converting MIDI input data, analog/digital audio input, or real-time instrument keypresses into relative rhythm coded data using the beat processing program of the invention, and related outputs, FIG. 17(b) is a flow diagram for a subroutine of finding beat demarcations in the input data in order to allow conversion into the relative rhythm coded data, and FIG. 17(c) is a flow diagram for a subroutine of assembling staff lines on a page of music notation for page-oriented storage or display using the converted, relative rhythm coded data;

FIG. 18(a) is a flow diagram for a conversion program for converting optically-scanned printed music notation into relative rhythm coded data, and related outputs, FIG. 18(b) is a flow diagram for a separate routine of finding staff lines and locations from scanned printed music notation and storing the staff structures as a separate form of notation data, FIG. 18(c) is a flow diagram for the subroutine of analyzing the rhythm and pitch content of the converted, relative rhythm coded data, and FIG. 18(d) is a flow diagram for the subroutine of formatting the converted, relative rhythm coded data into pages for page-oriented data storage; and FIG. 19 is a flow diagram for relative rhythm coding of input data wherein the pitch codes and rhythm codes are combined into a single stream.

DETAILED DESCRIPTION OF THE INVENTION

Music Notation Conventions

Figure 3:
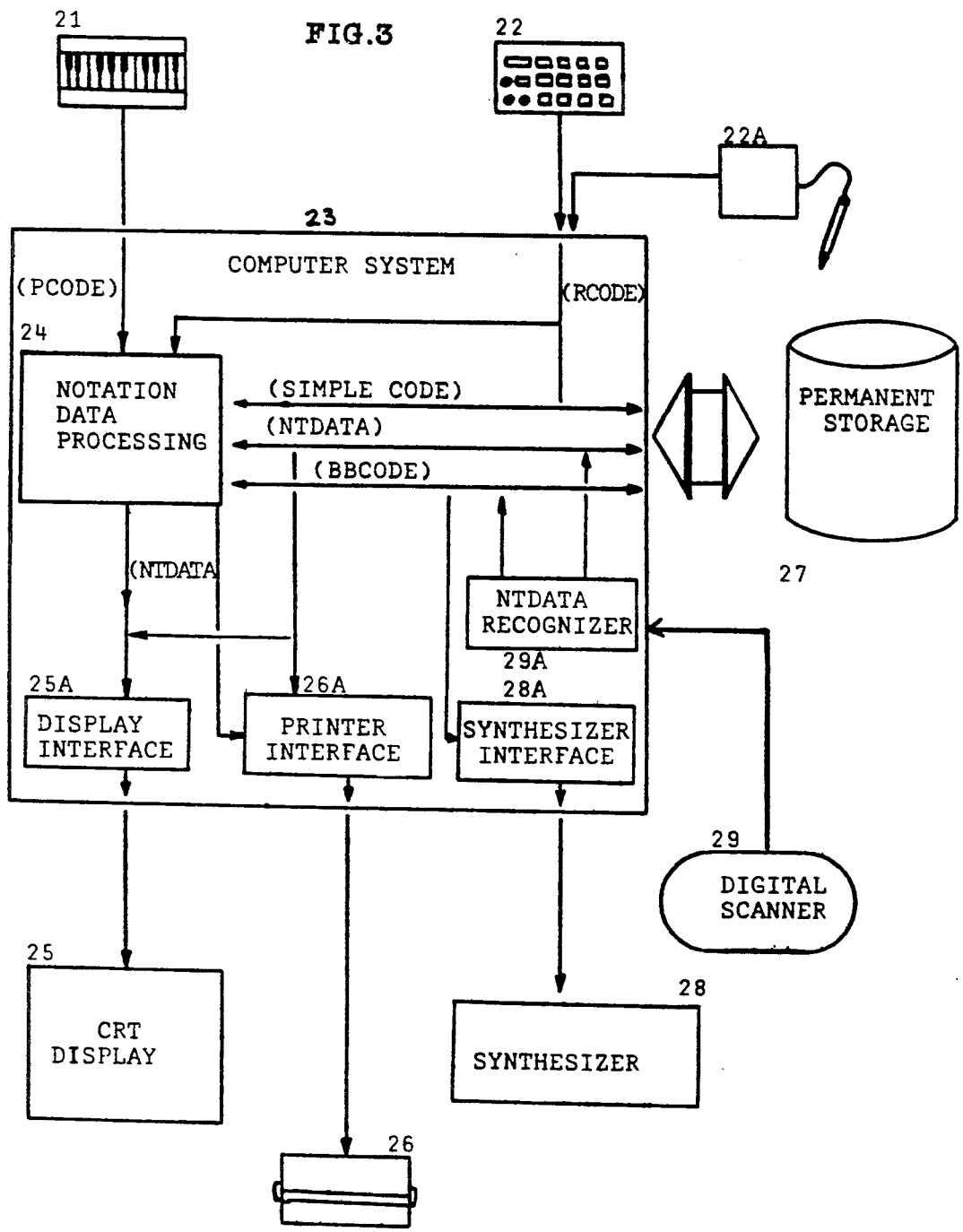
FIG. 3 is a schematic diagram of an overall computer system configuration including associated input and output devices and computer processing sections in accordance with the invention.

In the following description, certain conventions and terminology for music and music notation are used. These are discussed below in order to explain their intended meaning. However, it should be understood that the invention is deemed not to be limited by the conventions and terminology used within this description, but rather shall encompass the full range of potential forms and applications to which its general principles might be adapted.

Referring to FIG. 1, a musical score is written with notes marked on ledger lines 10, which are grouped in staffs 10a, 10b, indicating treble and bass clefs in which the music is played. The position of the notes on the lines or spaces of the staff represent the pitch of the note in the indicated octave. A fundamental key of the music ("C major" in FIG. 1) is selected to define the starting pitch of the octave scales indicated by the musical staff.

The staff lines are divided horizontally into measures by vertical bars 11. Each measure or bar of music is composed of a series of regular beats 12 which form the primary recurring rhythmic pulse of the music. For the implementation of the invention as described herein, the beat is the basic music duration interval for which music data are coded. A time signature is selected for the score to define the number of beats to a bar and the notehead expression of each beat. Thus, in the example of FIG. 1, music written in 4/4 time signature has four beats 12-1, 12-2, 12-3, 12-4, to a bar and each beat has a quarter note duration. The actual time duration of each beat depends upon the tempo by which the music is played. The tempo is set by individual interpretation, or may be set by a timing scale in music synthesizers.

The rhythm of the music, i.e. the ordering of sound, is defined by certain conventional rhythm elements or types, which include pitches 13, ties (continued pitch) 14, rests (pauses) 15 and 16, and dots (dotted notes) 17. A-dot follows a pitch note or rest symbol and indicates a sustaining of one half the duration of the associated note. It can also be used as an abbreviation for several ties. Pitch notes and rests have different notations depending on their duration. In FIG. 2, the conventional notehead designs using binary symbols for note duration are shown, along with the notations for ties and dotted notes.

An octave on a piano keyboard has a regular progression of 7 pitch names and 12 semitones from one octave to the next. In the key of C, for example, an octave progresses by pitches named C, D, E, F, G, A, B, C. The progression of pitches of an octave depends upon the keynote pitch and the convention for the progression of keys on the keyboard. Some pitches are assigned different pitch names depending on the key of the music.

Pitch notes are indicated in music notation by an inclined oval dot which, for fractions of a whole note, have a stem 13a on the left or right side. The stems may have flags 13b indicating binary note fractions, or they may have a beam 18 joining the stems of a group of notes in a beat. Beams can have different angles of inclination and lengths depending on the ascent or descent of the grouped notes, and may have multiple beam lines representing binary fractions to express divisions of the beat.

The actual duration by which flagged or beamed notes are played depends upon the proportions by which the notes divide a beat and the note duration assigned to the beat. If the actual duration of the note is a non-binary fraction of the beat, the convention in music notation is to depict the note with the closest binary fraction representation. For example, for a quarter-note beat interval, two combined (beamed) eighth notes indicate two pitches each played with an eighth-note duration, whereas three beamed eighth-notes (a triplet) are used to indicate three pitches each played in one-third of the quarter-note beat interval Thus, the conventional binary representations in music notation do not necessarily correspond to the actual durations of the notes when performed. Two or more notes beamed together may have a spline indicating that they are a dublet, triplet, etc. Standard music notation also includes articulation marks, such as for emphasis 19, de-emphasis 20, etc.

Overall Computer System

In accordance with the invention, a preferred system configuration is shown in FIG. 3. An instrument keyboard 21, such as a piano-type keyboard, is used to enter pitch codes corresponding to the pitch keys depressed into computer system 23. A control keyboard 22, such as a standard ASCII keyboard, is used to enter rhythm and command codes into computer system 23 as an independent data set. For ergonomic ease of use, the rhythm codes may be entered by other types of input devices such as foot pedals, a speech recognition module, light pen, mouse, head movement monitor, or other type of simple coding device.

The computer system 23 executes a program for music data processing functions, of which the main part in this invention is the notation data processing section 24. This section receives input pitch codes (PCODE) from instrument keyboard 21 and rhythm codes (RCODE) from command keyboard 22 or input device 22a, and processes them together in a Main Parsing Loop which generates output data tables (NTDATA) specifying music notation characteristics for final output to a screen display 25, through display interface 25a, and/or to a printer 26, through printer interface 26a. Permanent storage 27 is connected to computer system 23 for storage and retrieval of the notation data, and also of the original data sets PCODE and RCODE in Simple Code Form, and an intermediate rhythm data set BBCODE, as described further below. Previously stored Simple Form Code or BBCODE can be retrieved from permanent storage 27 and processed with modified compositional parameters by processing section 24 into a modified output for display or printing.

The pitch and rhythm data, preferably in the intermediate BBCODE form, can also be output to a music synthesizer, through synthesizer interface 28a, for producing sound. The pitch and rhythm data can also be derived by reverse processing of notation data provided from a digital scanner 29 used to scan an original printed or handwritten music sheet. The input from scanner 29 can be decoded by a feature recognition algorithm through recognizer 29a to extract data on notation characteristics in the same format as NTDATA, so that it is stored, processed, and/or output through the other parts of computer system 23 and its peripheral devices. Alternatively, a low level recognition algorithm can be used to extract pitch and rhythm data in the Simple Form Code or intermediate BBCODE formats.

The components of the above-described system can be assembled from computer equipment which is commercially available. The basic processing functions of the notation data processing section 24, receiving pitch and rhythm code inputs and providing NTDATA output for display or printing, will now be described.

Notation Data Processing

The system is initialized and the desired compositional parameters, such as time signature, key of music, main beat, notation form, spacings, etc., are entered by command codes on control keyboard 22. Once the system is initialized for composing, the user enters pitch codes by pressing keys on the instrument keyboard 21, and rhythm codes on the control keyboard 22 or ergonomic input device 22a. The two data sets are entered in non-real time, i.e. independent of each other and without regard to the actual way the final music is intended to be played. For example, the user may play the pitch keys for a beat, measure, line or several lines of music, then go back and enter the rhythm codes corresponding to those units. The user may also play the pitch keys while simultaneously entering the rhythm codes, by key presses, foot pedal control, speech command, etc., in or near realtime. If the rhythm codes are a series of recurring codes, they can be entered automatically by a macro command. The flexibility of entering rhythm codes as an independent data set from the pitch codes is an important advantage of the invention.

Figures 4, 6:
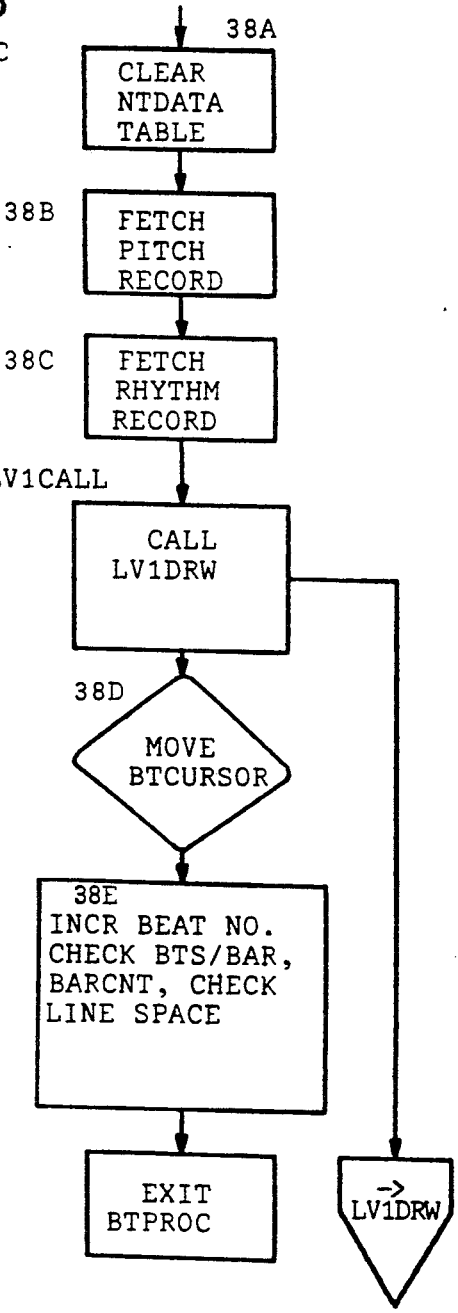
FIG. 4 is a chart of a preferred set of relative rhythm codes used in the invention.
FIG. 6 is a flow diagram of the Beat Processing routine of the processing program for processing the pitch and rhythm data in beat units.
Figure 5:
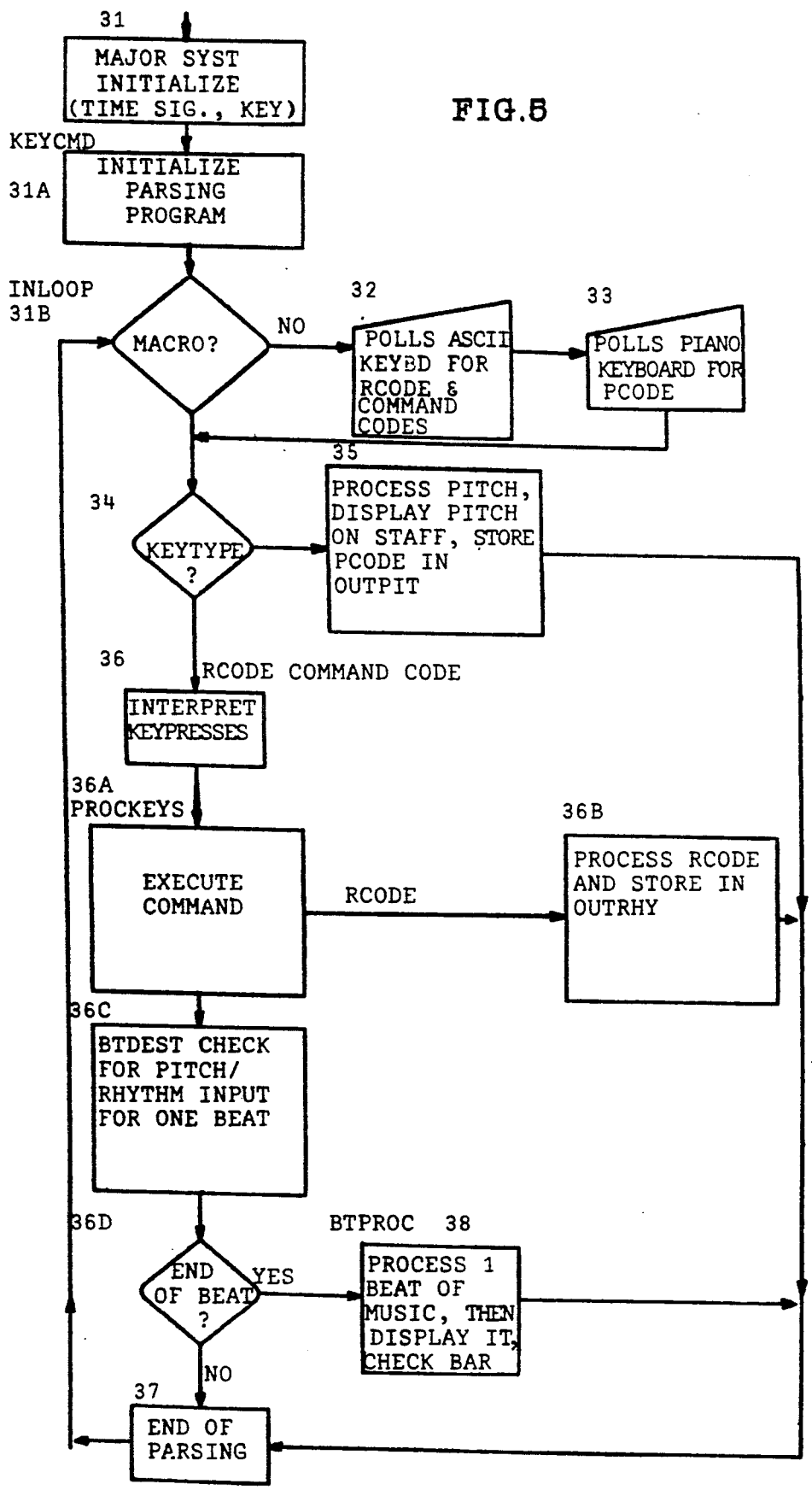
FIG. 5 is a flow diagram of the Main Parsing Loop for pitch and rhythm data in the preferred notation processing program of the invention.
Figure 13:
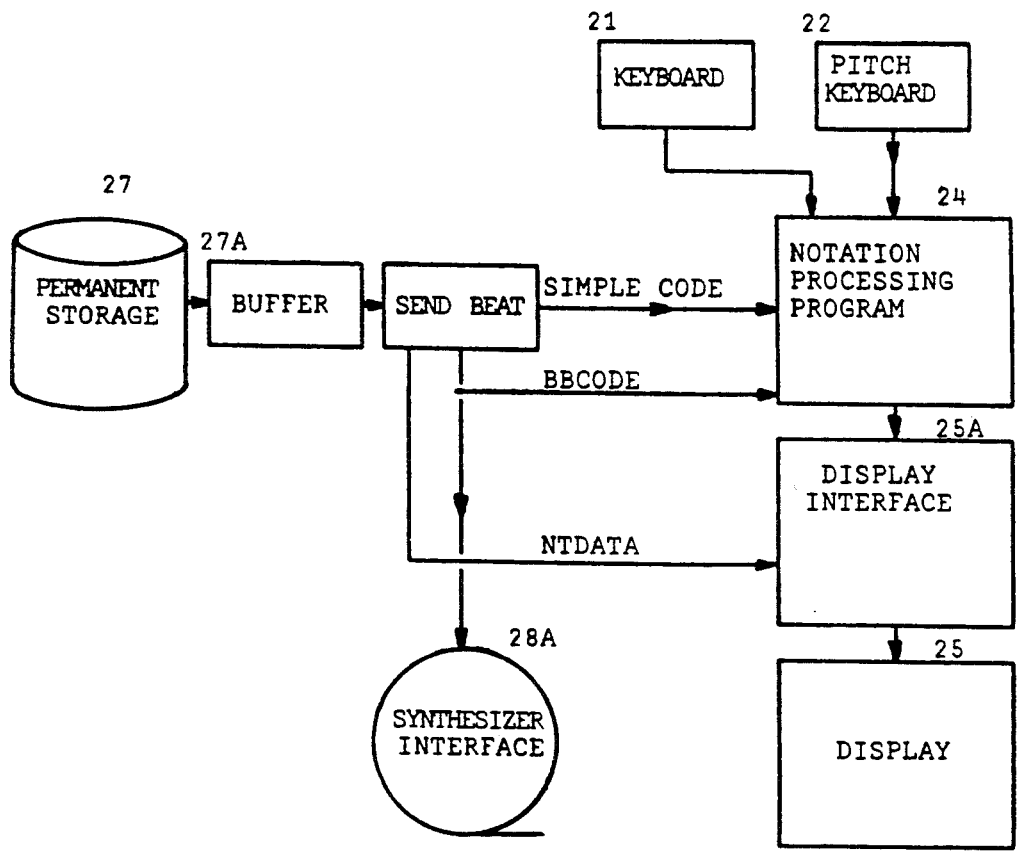
FIG. 13 illustrates regeneration of output data from permanent storage to associated output devices in beat units.

As the two streams of pitch and rhythm codes are entered, they are temporarily stored in buffers and parsed in Simple Form Code through the Main Parsing Loop shown in FIG. 5. In the described implementation of the invention, the notation processing section 24 processes pitch and rhythm data in beat units, i.e. according to the main beat specified by the selected time signature. The pitch and rhythm codes are thus processed by the beat processing loop BTPROC shown in FIG. 6, and by the beat data generating routines LV1 DRW, BCODI, BVNLOC, and BMRHY, and display output routine LV2DRW, shown in FIGS. 7-9, from intermediate BBCODE into output tables NTDATA which completely specify the beat units of music notation for output on the display screen 25 or the printer 26. The input and output routines for the beat data are shown in FIGS. 10 and 11. Previously stored data can be retrieved by the routine shown in FIG. 12 and regenerated as shown in FIG. 13 for a modified output using new compositional parameters or for mass output, such as for high speed printing.

Relative Rhythm Coding

A central feature of the invention is the use of rhythm codes which represent the relative proportions of rhythm types within a defined music interval, such as a beat. The fundamental music interval in Western music is the main beat. The use of relative proportion values for the rhythm elements allows their representation within a beat to remain unchanged even if the time signature of the beat or tempo of the music is changed. Thus, the notation can be readily changed for a different time signature, or one or both of the pitch and rhythm code sequences can be retrieved and modified, without having to reenter all of the original data.

The preferred set of rhythm codes of the invention are selected to have a one-to one correspondence to the rhythm types recognized in conventional music notation, for the convenience of the user in entering and interpreting the rhythm code sequences. The preferred rhythm codes thus comprise a set of main division codes, representing each rhythm type, i.e. pitch, tie, rest, or dot, which may divide a beat, subdivision codes for each rhythm type subdivision of a main division, a beat demarcator code, and beat multiple codes for a rhythm element occupying a multiple beat. Each beat is processed with all rhythm elements related to either main divisions, subdivisions, or multiples of the beat interval. The pitch codes entered as an independent data set are related in correspondence to the rhythm codes for pitches, and the integrated data can then be further processed to provide a display or printed output of fully featured music notation.

The preferred set of rhythm codes is shown with representational characters in FIG. 4. Each pitch entered on the instrument keyboard is associated with the pitch rhythm code "N" if it is a main division of a beat. A pitch subdivision of a main division is denoted by "n". Similarly, rests are denoted by "R" if they are main divisions of a beat unit, or by "r" if they are a subdivision of a main division. Ties are indicated by "T" and "t" and dots by "D" and "d" for corresponding main divisions and subdivisions. By convention, a beat interval cannot begin with a dot or with any subdivision. The end of a beat interval is denoted with a terminator code such as "/". For example, if a beat is composed of two pitches of equal duration, the rhythm codes "N, N, /" are keyed in. If a beat is composed of two pitches which are the onset of two equal intervals, and the first interval includes another pitch which subdivides the first interval, then the codes "N, n, N, /" are keyed in. Examples of other rhythm code sequences are shown in FIGS. 15(a)-15(g), together with their resultant data table and music notation.

By using a stream of codes to represent each rhythm element in the beat intervals, the relative duration values of the elements become implicit in their order and number, and the absolute duration of the elements can be derived for any specified beat duration (time signature). The use of subdivision codes provides a second order level of beat complexity which is commensurate with the limits of human performance of music. Higher order levels of relative rhythm coding may of course be used.

According to the principles of the invention, it is apparent that other rhythm code sets or more specialized rhythm types may instead be used. For example, beat division codes may indicate the proportions of beat divisions by numerical weights, the rhythm types may be numerically coded, independently entered, or entered with the pitch codes, a beat commencing code instead of terminator code may be used, or the basic duration interval may be a measure of music rather than a beat. Such variations are nevertheless encompassed within the principles of relative rhythm coding as disclosed herein.

Since each beat is delimited by a terminator code, the rhythm codes can be input without any required continuity, as can the pitch codes. The notation processing program parses the two independent data streams through the Main Parsing Loop and processes a beat output whenever sufficient pitch data and rhythm data followed by a terminator code are input. The terminator code is used herein as a beat delimiter, but a beat initializer could instead be used. The relative rhythm coding also includes an autoterminator code "A" for providing a recurring series of rhythm codes followed by a terminator code automatically when the music being composed has a regular number of pitches in equal main divisions of each beat. This allows the rhythm coding to be handled automatically by a single keystroke for convenience of data entry for many standard rhythms.

The main rhythmic types, i.e. pitches, rests, ties, or dots, represent the conventional musical rhythmic notations. Depending on the time signature and the main beat duration, any combination of these rhythmic types may be used in a beat, and the resultant notation for a beat may be expressed with the notes joined together by horizontal beams and tuplet indicators. If the time signature is changed, the relative proportions of the rhythm elements are nevertheless preserved over the current fraction or multiple of the original main beat, and the resulting notation may be expressed differently, i.e. with multiple or no horizontal beams or different notehead designs.

The relative rhythm coding includes auxiliary codes for multiples of a beat unit, e.g. when a rhythm element has a duration of multiple beats. In FIG. 4, three integer multiple codes are shown. Also, a particular series of rhythm codes which is used frequently may be input through a single keystroke by use of a macro key, which provides a stored stream of characters as input codes.

The relative rhythm coding of the invention is selected to be a small, manageable set, but it may of course may be expanded if more complex rhythm coding functions are desired. A small set of rhythm codes allows the rhythm data to be input rapidly and with a minimum of interruption so that the user can simultaneously input the pitch codes from the instrument keyboard 21 if so desired. In the system shown in FIG. 3, the rhythm coding is entered by any selected alphanumeric keys on the control keyboard 22, but it may instead be entered through other, more ergonometric input devices such as foot pedals, a speech recognition unit, a monitor for head movements, or pointing or contacting devices such as a light pen, touch tablet, mouse, etc.

Main Parsing Loop

The Main Parsing Loop for pitch and rhythm codes in beat units is shown in FIG. 5. Block 31 indicates the major system initialization steps, such as interfacing the various system components for the notation processing mode. KEYCMD at block 31a indicates the initialization steps for user parameter selections and establishing the internal parsing program to receive and process pitch and rhythm codes as they are input from the instrument keyboard 21 and control keyboard 22, and to display the output notation on staff lines set up on the CRT display 25 for visual confirmation to the user. Program control then enters INLOOP at block 31b, which commences with a test whether a macro sequence of codes is being stored or sent. If no macro sequence is in effect, the parsing program polls the control (ASCII) keyboard for a command or rhythm code (RCODE) keypress, at block 32, and the instrument keyboard for a pitch code (PCODE) keypress, at block 33. Simultaneous pressing of more than one pitch key (a chord) is treated as one pitch key event for purposes of the description herein.

The program proceeds to block 34 which sends the PCODE to block 35 where the pitch is identified and displayed on the staff lines as it is entered (without rhythm information) for visual confirmation. Pitch processing at this stage includes determination of all attributes of pitch information needed for proper musical notation, e.g. pitch name, accidentals (sharp or flat), location on the staff lines, a chord, etc. The processed pitch data are then stored in a temporary pitch buffer OUTPIT.

A command keycode or the RCODE is branched from block 34 to block 36, where it is interpreted, and then to PROCKEYS at block 36a. The PROCKEYS routine executes an indicated command, or branches the RCODE to block 36b where it is converted to Simple Form Code (binary number) and stored in a temporary rhythm buffer OUTRHY. The parsing program then goes to block 37 at the end of the parsing loop where it returns to INLOOP. At block 36c, a check BTDEST is made whether sufficient rhythm and pitch codes have been received for a beat and whether a beat termination code is received. If so, the program branches at block 36d to execute the BTPROC routine at block 38, which is the main routine for generating the complete output notation for each beat. When an output beat is generated, it is displayed on the staff lines (the pitch-only display is erased), then the beat counters are incremented and a vertical bar line is drawn if a measure of music has been completed. The parsing loop then receives the next input by returning to INLOOP.

Beat Processing

Referring to FIG. 6, the main beat processing routine BTPROC commences by clearing an output data table NTDATA for the beat, at block 38a, fetching the current beat pitch record from OUTPIT at block 38b, and fetching the current beat rhythm record from OUTRHY at block 38c. The program enters LV1CALL and calls the routine LV1DRW, described further below, for processing the pitch and rhythm data into its final output form, which is then stored as output data and displayed as a completed beat on the CRT display. The program then moves the beat cursor to the current beat space on the staff lines of the display, at block 38d, and increments the beat counter, checks the space remaining on the current line, and checks the beat count for a completed measure, at block 38e. The program then exits BTPROC and returns to INLOOP in the Main Parsing Loop for the next beat.

Figure 7:
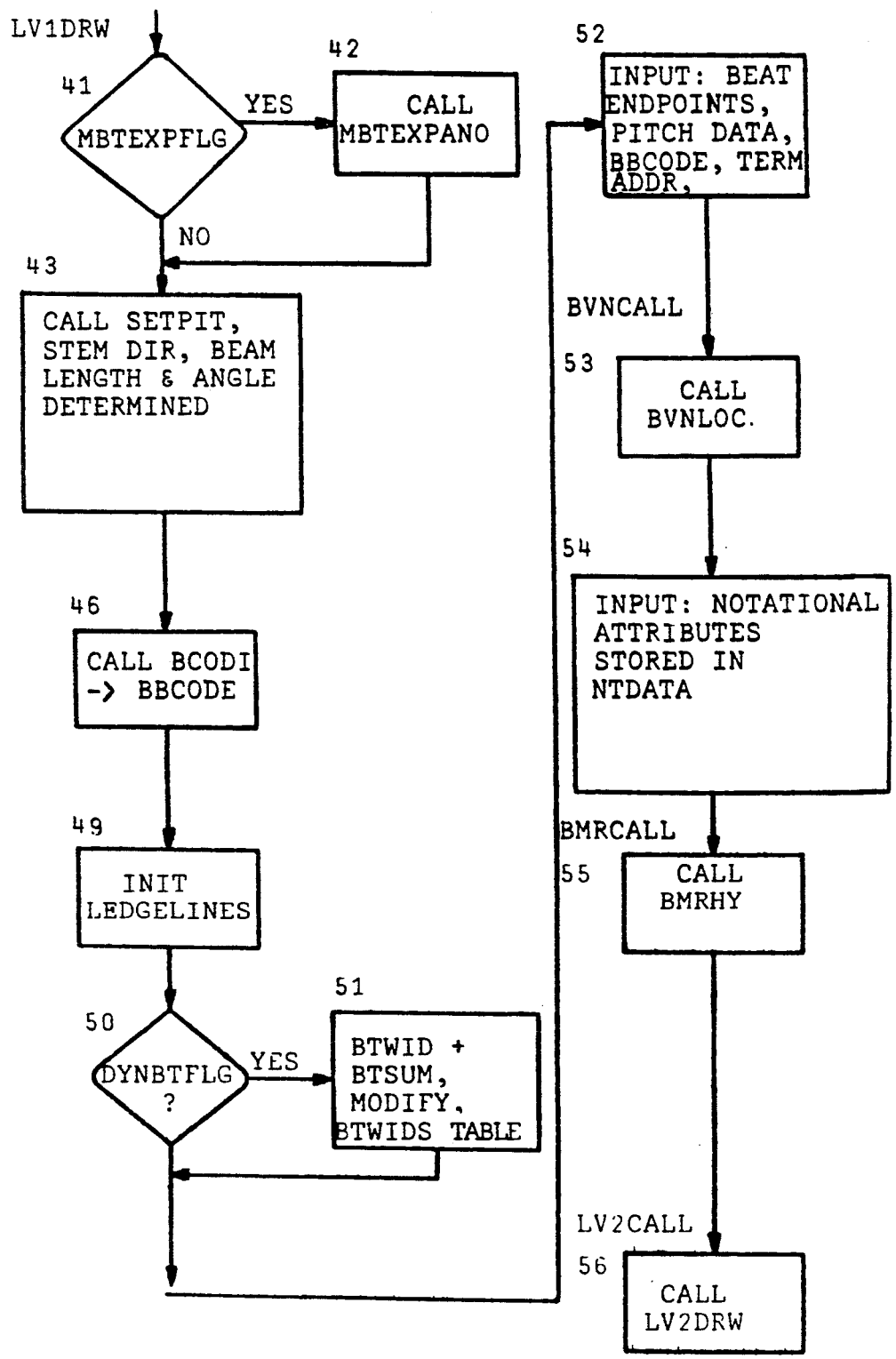
FIG. 7 is a flow diagram of the LV1DRW routine for processing the pitch and rhythm data into an integrated music data output form.

The routine LV1DRW, shown in FIG. 7, commences by checking at block 41 whether the code for a multiple beat interval (beat multiplier code in FIG. 4) is present. If so, the routine MBTEXPAND is called at block 42 to expand a beat interval code into two or more beat interval codes in a form compatible with subsequent rhythm data processing. At block 43, the routine SETPIT is called to process the pitch data further to determine the stem direction (upward or downward) and any flag or beam attributes for the output notation. At blocks 44 and 45, a check of the stem direction is made and the pitch data is modified so that the specification of notes corresponds to the proper stem direction.

The program then proceeds to block 46 where the further routine BCODI is called to convert the rhythm data for the beat from Simple Form Code to the intermediate form BBCODE. BBCODE is a conversion of the rhythm codes from a simple number to a form where the relative proportion of each rhythm code element within a beat is expressed. At blocks 47 and 48, a check is made whether the current beat is a multiple of the main beat interval and, if so, the beat width and end of beat notation are appropriately modified. At block 49, the ledger line data for the current beat is initialized. At block 50, a check is made whether the current beat is the end of a series of beats having simple notation which can be compressed into a smaller width for one measure on a line of output notation, referred to herein as a "dynamic beat". If so, the beat widths are recalculated and modified, at block 51, and a compressed notation for the measure is substituted for the constituent beats.

At block 52, the pitch and rhythm data is now sufficiently specified so that processing of them together can take place. At BVNCALL 53, the subroutine BVNLOC is called to merge the pitch and rhythm data together, as explained further below. The output of BVNLOC is integrated information on all required attributes of the note(s) occupying the current beat (at block 54). In preparation for final processing for an output display of notation, the integrated information is input at BRMCALL 55 to the subroutine BMRHY which calculates all of the stem, beam, and beat dimensions corresponding to the specified note(s) in accordance with standard music notation. The program then proceeds to LV2CALL 56 where the output graphics display subroutine LV2DRW is called. This completes the processing and output display of one beat of music, and control then returns to the Main Parsing Loop for the next beat.

Beat Subroutines

Figure 8A:
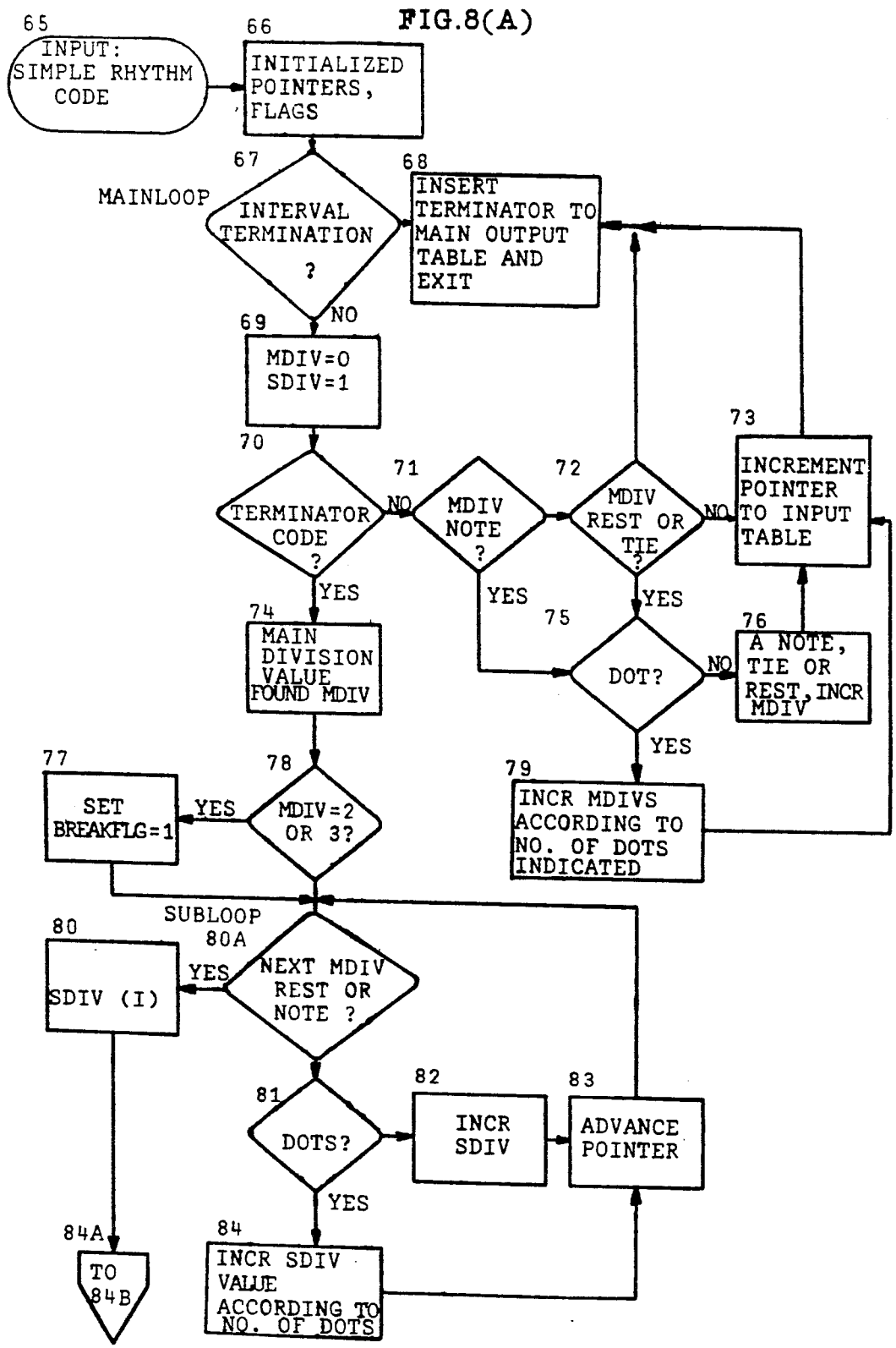

The subroutine BCODI for converting the rhythm codes for a beat in single byte (Simple) form to the intermediate BBCODE is shown in FIGS. 8(a) and 8(b). Simple Form Code for the rhythm codes are input at block 65. The BCODI pointers are initialized at block 66, and the program enters MAINLOOP 67 with a test for termination. One main beat interval at a time is processed through MAINLOOP. If there are multiple main beats in the current beat interval being processed, MAINLOOP is reentered until a termination for the complete sequence is detected, as shown at block 67.

Processing for each main beat interval begins with initialization of the counters for main-divisions and subdivisions in the beat, at block 63. The rhythm codes are then parsed through the loop 70, 71, 72, 73, 75, 76, 79, until a total count MDIV, at block 74, of main division codes has been counted. MDIV represents the number of main division intervals into which the beat is divided. At blocks 77 and 78, a test is made whether the number of main division codes is two or three, in order to set a BREAKFLG which results in output beamed notation having breaks in the beaming if any subdivisions of a main division are present, according to music notation convention.

The program proceeds to SUBLOOP 80a, 81, 82, 83, 84, where each main division is checked in turn for subdivisions. When the count of subdivision(s) SDIV(i) for the current subdivision is obtained at block 80, the program proceeds to block 85, in FIG. 8(b), where the product of MDIV and SDIV(i) is obtained. This product represents the relative fraction of the beat occupied by each of the rhythm elements expressed by the current main division code and following subdivision code(s). In the loop 86–98, the program parses through each of these fractional rhythm elements and loads the BBCODE representing their fractional proportion of the beat. When the current main division has been processed, the program proceeds with a test whether the current beat is completed, at block 100. If yes, a terminator in BBCODE is inserted, at block 99, and control returns to MAINLOOP at block 102 for conversion of the next main beat interval. If no, a check is made for a BREAKFLG at blocks 101, 103, in order to insert a BREAKSYM code for beam breaking in the final output (mentioned above), and control then returns to SUBLOOP at block 104.

Figure 15D:

Referring to FIGS. 15(a)–15(d), some examples are shown of rhythm codes converted to the BBCODE form. In particular, FIG. 15(d) shows one which includes main division, subdivision, tie and rest codes converted into BBCODE. BBCODE is represented by an integer representing the rhythm element's fractional space in the beat and a character representing the type of rhythm element. BBCODE thus expresses the relative fractions and types of rhythmic elements as a highly compressed data set.

The BVNLOC subroutine shown in FIG. 9 fills in the output table NTDATA with further specification of the various notational and spatial attributes of the output notation corresponding to the pitch and rhythm data in accordance with standard music notation conventions. At block 120, pointers to NTDATA are initialized. A test is made at block 121 if the previous beat is tied to the current beat. If so, then a tie marker is stored in the NTDATA table. MAINLOOP 122 is the entry to a parsing procedure for determining the notational attributes of tied or dotted rhythm elements.

Beginning at block 128a, a test is made at block 129 for a note or tie. If yes, a test is made at block 129a whether the next adjacent elements are ties or dots. If they are not, a single note is detected (block 130), and control goes to blocks 139a and 140 where the subroutine BTDIV is called for computing the attributes of single note, rest or tie. If there are adjacent ties or dots to a note or tie, their number and beat fraction are determined at blocks 131, 132. BTDIV is then called at block 133 to determine the note duration (based on the time signature and relative beat fraction) and the appropriate notational attributes, i.e. type of notehead, stem flags, number of beams, placement of dots, etc., and STORE is called to load all generated attribute information together with the associated pitch data to the output table NTDATA. Tests are made at block 141 for beam values, stem flags, dots, and other data to be stored in NTDATA. Control goes to CONTINUE 142 and returns to MAINLOOP 122.

If the test at block 129 is negative, a test is made at block 134 whether the current rhythmic type is a rest, and if so, blocks 134a, 135, process for a single rest or for a tied or dotted rest, similar to the procedure described above. If the test at block 134 is negative, a subtest for a BREAKSYM (beam break) code is made at blocks 136, 137, and for a multiple beat at block 138. If a multiple beat is present, the subroutine FRACTAD is called to determine the fractions of the beat allocated to the current rhythmic notation. Control then returns to MAINLOOP 122. If the list of rhythmic types for the beat is ended, the program exits at block 123, then tests for beams at block 124. If no beams are present, then the default beam values are suppressed.

After exiting BVNLOC, the further subroutine BMRHY is called to provide further notational attribute information in which the key coordinates, contours and endpoints of the notation elements are specified. The subroutine LV2DRW is then called to generate the complete contour and mapping information for output to the display screen. An example of some of the various notational attributes processed into NTDATA in the processing program is shown in FIG. 14.

Input/Output of Music Data

The notation processing program described above is beat oriented in that it processes input pitch and rhythm data in beat units and outputs a completed beat of music data. As shown in FIG. 3, the notation data processing 24 is the center of input/output flows connecting the input keyboards and devices 21 22, 22a, the permanent storage 27, and screen display 25. An I/O program loop is shown in FIGS. 10 and 11. Beginning at INLOOP, the program determines whether input data is obtained from a keyboard, the screen display, permanent storage, or a macro buffer. If from a keyboard, input is provided by the keypresses, or if from the screen display, then it is fetched via the screen matrix. Input from permanent storage (hard disk) is fetched via a beat matrix which stores all the addresses for each beat of the entire music for random access and global editing. Regardless of source, input is provided for one beat at a time and processed through the notation processing program to generate one beat of music data output.

The beat output in FIG. 11 may be sent to the screen matrix, a macro buffer, and/or hard disk matrix. Data processed in the notation processing program may be stored on the hard disk as Simple Form Code for the streams of keypresses from the keyboards, intermediate BBCODE representing the rhythmic proportions and types in compressed form and the pitch names, and/or the output table NTDATA for generating a complete display of beat notation. In the I/O program, if the SOUNDFLG is set at block 240, then the output data may provided in the compressed (BBCODE) format suitable for realtime performance. This format may be used, for example, to provide music data to the synthesizer interface 28a, in FIG. 3, for synthesizer performance. For certain high speed or high volume applications, such as printing hard copy, searching, or mass storage, the music data for an entire section or scor of music may be held in a cache memory and output in a continuous stream.

A flowchart for music data storage and retrievel is shown in FIG. 12. In the preferred beat oriented system of the invention, a beat received from the notation processing program is assigned a key address which is stored in BTMATRIX. Searching and retrieval of music is obtained by requesting the key addresses of the music section of interest, and the stored data is loaded in a buffer area where it can be used in the music program or another connected device or interface. Beat matrix manipulations can be performed to relocate sections of music or to copy, or alter data in some way. This facilitates insertions of new material, deletions, or copying, and allows high level manipulation of large data sets.

In FIG. 13, a process for regenerating stored music data is shown. Music data retrieved from permanent storage 27 is held in a buffer 27a from which data is sent in beat units. The beat data may be stored in Simple Form Code, BBCODE, and NTDATA. Simple Form Code can be entered in the notation processing program at the entry point to the BTPROC routine, from which it is regenerated into NTDATA and displayed on the screen. Modifications or new compositional parameters can be specified through keyboards 21, 22, in an editing mode, and the modified beat can be displayed and stored. NTDATA may instead be regenerated from BBCODE by a macro command providing the input in the program sequence to BVNCALL, or retrieved data in NTDATA form may be provided to the display interface 25a. The compressed BBCODE format is suitable for performance of the music in realtime through the synthesizer interface 28a.

Other Functions: Applications

The notation processing program can also have other program sections for entering other notational features on the score in accordance with the full features of standard music notation. Articulation marks may be entered by selection from a list of icons or marks displayed on the screen using function keys on the control keyboard or other computer input device, such as a pointer, touch screen, or mouse. The desired mark is positioned in the proper score area by program control or by movement of a cursor (pointer) to a particular note, beat interval, measure, or position on the staff lines. The program for entering articulation marks includes a function for controlling the movement of the cursor so that it jumps by incremental note, beat, or bar positions for ease of use.

Stored pitch and rhythm codes, as well as the output NTDATA tables, can be retrieved and modified for notation in a different key of music and/or time signature. The pitch and rhythm codes can be independently modified, for example, to produce a stored melody with a different rhythm, or a different melody with the stored rhythm, or some combination of both. Music analysis tools can be applied to analyze melody, harmony, chord progression, rhythm, and other sub-attributes of the full music notation interactively via the display screen, keyboards, or synthesizer. The flexible format of the relative rhythm coding of the invention allows music of any complexity to be easily and rapidly input to the system for printing, modification, or display. The computer system may be interfaced with a printer of typesetting quality for sheet music production. The interface may include routines for compressing data, producing special fonts or marks, etc.

The computerized notation system can be advantageously applied to parts extraction from or to an instrumental work or larger symphonic score. The parts of a symphonic score for different instruments are often printed with different measure and line spacings and notational formats and attributes. The relative proportions of rhythm elements represented by the relative rhythm coding facilitates the recalculation of notational formats. With the editing and modification capability of the system disclosed herein, the several instrument parts can be readily extracted and printed by data file manipulations.

The invention has important advantages over conventional music notation systems. Since the pitch codes are independent from the rhythm codes, the code input need not be played in realtime and less musically skilled persons can operate the system. This increases the utility of the system and allows savings of labor cost in high-volume music notation processing. The expanded capability of transposing the pitch and rhythm codes into another key or time signature makes possible a wide range of automated music publishing functions.

The intermediate BBCODE format is a compressed data set which can be readily adapted as an input to conventional synthesizers. The problem of conventional binary notation conflicting with non-binary time durations in performance, particularly with synthesizers, is obviated since BBCODE preserves the actual relative proportions within a beat, while NTDATA is usable to generate notation according to music convention. Also, digital scanning and feature extraction systems can be used to provide notational input to the present system from printed or handwritten original sheets. The compressed data set BBCODE can be relatively easily derived through feature extraction, and the notation processing program can be used to regenerate the full notational output tables (NTDATA) for display, permanent storage, editing or modification.

Although a preferred implementation of the invention has been described above, it should be understood that many variations and modifications are possible within the disclosed principles of this invention. The rhythm codes might be modified to include other rhythm types or other relative division markers. For example, instead of main division and subdivision markers, numerical values may be assigned to each rhythm element representing their relative proportions within the beat. The basic interval may be a full measure of music instead of a beat. The notation processing program may be simplified, and the beat processing routines may be implemented by ROM addressing or tree-structure decoding of rhythm code sequences rather than program operation. Other types of beat processing algorithms will occur to one skilled in this field given the disclosure herein. Further, other types of peripheral data entry, storage, output, and associated musical devices may be connected to the disclosed system. Examples of such alternative or associated techniques and/or devices are described below.

Musical Instrument Using Relative Rhythm & Pitch Codes

Referring to FIG. 16A, a computerized multi-function musical instrument is designed to incorporate the relative rhythm coding of the invention. The pitch, rhythm, and control data can be entered with any one of many possible types of input devices 160-162. These devices can be traditional 'musical' keyboards having electronic (MIDI) interfaces, such as a piano keyboard, guitar, wind instrument, etc. MIDI is a widely used digital data format for music data in electronic keyboards and other musical instruments. Pitch input may be converted into MIDI data format, as indicated at block 164, via keypresses from the instrument keyboard.

Alternatively, the pitch codes and other data codes may be produced from a 'non-musical' device. A 'non-musical' device may be, for example, a typing-style keyboard, or a microphone for speech input. Other examples include a 'mouse', a touch panel, an electronic pad for handwriting recognition, or a head pointing device. Visual feedback for differentiation of codes can be facilitated by dynamic icon representations on a raster device, by static icons, e.g. keyboard or bitpad, or by sounds. All three types of data: pitch data, relative rhythm data, and control data, can be represented and entered using combinations of the aforementioned 'musical' and 'non-musical' interfacing devices. For all of such input devices, it is desireable to use a set of icons corresponding to each of the relative rhythm codes to be controlled by the user for complex non-real-time music input.

Referring again to FIG. 16(a), mode selection at block 163 is for setting different major modes in the device, such as for handling different forms of input or music data formats, controlling a display of music notation, loading external control data, or enabling other desired visual displays and other audio and digital effects, as indicated at block 172. Central to the device is the input and manipulation of relative rhythm codes. When the instrument is operated in a relative rhythm data mode, input from devices 160, 161, 162 is collected and parsed at the Relative Rhythm Coding module 165, using the procedures previously described. In order to generate a display corresponding to the input, the relative rhythm coded data is passed to the Notation Processing module 169 which executes all complex data transformations (as described previously) from the simple input codes to notation output to an internal/external display 174/178 or printer 175/179. The notation display may be in the form of simple beats, multiple beats, measures, or a number of lines.

Other outputs for digital or audio controls are indicated at block 176. An audio output is also available through the audio synthesizer 171 and mixer and sound enhancement module 173. The module 173 provides sound enhancement such as digital delay, mixing equalization, etc. Special visual effects may also be used, as indicated at block 172, such as monitoring video or film images images with music notation and sound for motion image scoring.

MIDI data from MIDI conversion module 164 can be fed into a relative rhythm conversion module 170 which translates MIDI or real-time music data into relative rhythm codes. The relative rhythm coded data can then be stored and simultaneously or later processed at blocks 165 and 169 for a display of the corresponding musical notation. The details of the MIDI or real-time data conversion is described below with respect to FIG. 17(a). Storage 167 is provided for any or all of the types of data used, and facilitates easy manipulation and later conversions of data from one form to another. Types of data which may be used, converted, and/or stored include MIDI data, relative rhythm codes, pitch codes, and control codes, control or mode selections, or external audio and digital effects used for sound or display production. The preferred storage of music data may be either in a simple format of the relative rhythm codes and pitch codes, or else more a complex data format describing full score notation. The storage media would also be useful to exchange data with external devices for further processing, such as through removable diskettes or a data I/O port, indicated at block 180.

All of the above can be integrated into a single musical instrument system in a compact form. Such a system would the advantage of multi-mode playing in real-time or non-real time combined with composing and editing of the corresponding music notation in non-real time. Editing is made vastly simpler and quicker using the relative rhythm coding of the invention since the durations for the notes of a music piece are recomputed by computer processing with any change of one or more notes. This provides a powerful tool to the composer similar to the word-wrap function in word processing, or cell linkages in electronic spreadsheet calculations. The relative rhythm codes also allows important and complex beaming and dotted note relationships to be specified in a relatively simple data format. The processing and storage of music data in the low data rate format of relative rhythm codes, pitch codes, and control codes can proceed at high speeds and with a very high data compression ratio, compared to the processing time and amount of storage which would be required for conventional techniques of computerized music notation.

Portions of the above system may also be incorporated or retrofitted into existing electronic keyboards and instruments to provide them with a non-real time music processing capability. The described system can also be optionally hooked up to external devices or a high level graphics or sound processing computer for enhanced processing or capability. External synthesizers may be connected to access a greater variety of synthesized sounds, as indicated at block 177. External screens and displays 178 with higher resolution or greater color ranges, and the ability to display more pages, can also be connected. A higher resolution printer 179 may be interfaced with the output from the described system and scaled to provide very detailed notation output. Other external devices, indicated at block 180, may include other computers, other computers running external music systems, communications devices, and digital sound control mechanisms. External user interfaces can be used to record real-time performance, setting MIDI data in different polyphonic modes, etc. as indicated at module 168. Mode selection 163 can control different types of notation displays (refer to FIG. 16B) or the sound enhancement equipment 173. The input at reference 168A represents connection to an external device which provides the input data that controls digital audio effects of the instrument system and which also can also be stored be as music samples or sequences for later replay. This input steam could also be from another computing device which can interact with the described system in real time. This would expand possibilities in real-time performance.

Referring to FIG. 16B, the screen output of the described instrument system may have one of several types of notation displays. The display screen is to be of a minimum optimal size allowing clear display of musical graphical displays. Selection control 190 is used for selecting the type of display of notational data and control 198 is used primarily for command functions. A first type of notation display is the 'regular' mode which displays standard musical notation 191. A second notation display mode 192 is for training a user to associate pitch names with the lines and spaces of the staff in different clefs. This is accomplished with pitch name letters within white space circles representing noteheads. A third type of notation 193 provides separate display areas for pitch and rhythm keys. Pitch notes are represented by black ellipses on the staff, while relative rhythm codes are shown as letters aligned with the pitch notes above the staff lines. The providing aural sound and visual notation feedback will facilitate the training of a user in learning the musical principles of relative rhythm coding. Another example 194 combines regular notation simultaneously with relative rhythm codes. The rhythm codes indicate the main and sub divisions of the beat and clearly show the intrinsic nature (and its relation to time) of the rhythmic force. The fifth example displays guitar tablature 195 showing the corresponding fret numbers on guitar strings. The strings are shown with the lowest guitar string as the lowest line of the tablature staff.

Modules 198 through 202 show other general purpose commands which are useful in dealing with notation of musical scores and compositions. Inputs for music sound, at block 200, or music symbols 199 are used for non-real-time generation of musical notation. The modules 201 and 202, labelled Editing & Navigation and Misc. Commands, control the reviewing and manipulation of entered data.

Referring to FIG. 16C, the instrument system has an external configuration utilizing a screen display, i.e. outlined in rectangles A, B, C, D, a piano style keyboard 212, a pointing device (trackball) 213, relative rhythm code keys 209, and function keys 208 (extending horizontally to the right). The display screen is divided into two major areas, i.e. the notation display 205, the command display 206, and the function key labels 207 which displays graphical icons which can dynamically define the row of tactile keys beginning at 208. The function key labels 207 allow one set of physical keys 208 to have multiple definitions. The command space 206 is also used to generate feedback patterns to reflect user actions such as providing icon feedback when relative rhythm code keys 209 are pressed. The command display interface is not restricted to only two areas, and in general may offer any number of areas for commands and feedback/display. For example, the rectangles may be nested like windows within one another to allow multi-step procedures to prompt the user for successful completion, or, multiple pages of music may be shown simultaneously.

Keys 210A–210G are keys for 'directional' commands, i.e. left, right, up, down, forward, backward, not only for the cursor 216, but also for the 'direction' of defined functions. For example, one important set of functions that can be interfaced using this set of keys is controlling the playback of sound, recording of real time performance, and in navigation. Playback of sound in the forward direction is controlled using key 210D. Recording a real time performance can use two of the keys, i.e., 210F to record, and 210D to playback, as in the convention with audio tape recorders. Keys 210A and 210E can control rapid backward and forward controls on sound production. These keys are useful for listening to a recorded performance when the user wants to move ahead or backwards quickly without having to stop or interrupt the flow of music. While interacting with the notation, keys 210B, 210C, 210D, and 210G can be used for navigating around the page as an alternative to the pointing device 213.

Real-time and non-real-time input is handled with the main interfacing keyboard 212, which can also be used for any other type of instrument, e.g., clarinet, violin, or guitar instrument. The pointing apparatus 213 is linked to the cursor 216 on the notation page 205 and is the major interface between the user and the display command areas 206, 207 and 208. Optional devices can also be connected to the main apparatus. Some options are an ASCII keyboard 214 and a foot pedal interface 215.

The latter can contain a mixture of function and relative rhythm keys and thus provides an alternative method for entering relative rhythm codes. Using the foot to enter rhythms would free the user's hands to enter pitch data without interruption.

Conversion of Fixed Data to Relative Rhythm Codes

Conventional musical data formats, including time-sampling and MIDI data, specify notes of fixed time durations. The invention provides fundamental advantages by processing and handling musical data in relative rhythm code format. The conversion of fixed data into relative rhythm codes serves the purpose of translating real time performances of music into the more efficient notation data format. The system of the invention provides the option of converting a number of sources of musical input into relative rhythm codes. The first, and most common, input source is standard MIDI data, indicated at block 220, which is used by many types of electronic instruments. The standard MIDI format is the most easily implemented and provides easy access to pitch information and the separation of parts. Another source of input is analog or digital recordings 221. If the source is a monophonic signal, the input is handled relatively easily via commercially available analog to digital converters using microphone input. Separation of polyphonic sources is a much more difficult task, and can be accomplished through sophisticated spectral analysis techniques. A third input source is a non-MIDI real time device 222 where real time performance events (keypresses) are recorded and/or converted at block 223 to digital frames by time-sampling so as to preserve their real time relationships.

The next stage is to initialize score data 224 and to set input and output files 225. The score data is established to receive the output of the converted pitch and relative rhythm code output. Next, the real time data is translated into the 'Event' format, as indicated for block 227, wherein every event contains data about groupings, the beat that contains the event, its duration, volume, and pitch note number. Several operations take place to prepare the data. One is to modify the metronome note, at block 231, and another is to find the distribution of keypresses according to the player's hand, indicated at block 231A. Another is to determine chord groupings and to determine parts, at blocks 232-234.

Most crucial of all is to find the beat locations, at block 235, in one of two modes, i.e., with or without use of a metronome. The following discussion refers to conversion using a metronome. However it is also possible to do conversion if the user did not use a metronome during real time input. This mode is almost identical to metronome conversion with the difference being that the conversion program makes its own theoretical projections on the beat's location in relation to performance events. The pages building section 236 is the final stage of conversion to relative rhythm codes and pitch codes from the real time input. It creates organized page structures which serves as input to subsequent output or storage processes. Beat Processing 237, as described above, is used to render the musical notation output for the display screen 238 or printer 239. Sound production at 239A can be handled by parsing the rhythm and pitch streams and converting the relative codes back to MIDI for audio output.

There are three types or levels of beats in order of lowest to highest precedence: (1) theoretical beat; (2) machine generated metronome beat; and (3) performance events that occur on the beat. The metronome is an automatically generated MIDI note which is filled into the MIDI stream and during real time performance it is an audible signal that is used as a reference. The assumption is that the performer will use this metronome as a guide for the beat, but will not necessarily play precisely on the beat. One usually plays consistently a little before or after the precise metronome beat and the program code for interpreting events will take these latitudes into account. Therefore, since the metronome flag is set, performance events in relation to the automatic metronome are evaluated as possible candidates as Beat locations. The table BeatTable 226 is used to collect these values.

In FIG. 17(b), the beat locations are found by a loop routine. In the first step, the basic tempo is provided by the MIDI input stream where four introductory beats are given, i.e., the first four events from the EventsTable 227 of FIG. 17(a). A beat interval BeatSize is found by taking the average of the first four beats. A pointer EventPtr is initialized and will be used to parse the EventTable 227. In preparation, several variables are initialized, at block 240, including the BeatSize (all in units of hardware clock intervals), the current time, the actual beat number which is an index value BeatNo, and the time of the next beat. Generally, a two-beat (one beat prior to and one beat after the beat being evaluated) estimate is taken and then set MaxTime=NextBeat+BeatSize. MaxTime is the maximum interval from CurrentTime within which the event evaluation takes place.

Within the processing loop 241, the table BeatTable 226 is filled by the following steps. First, a 'theoretical' beat is calculated where a maximum time MaxTime is found by adding an interval to CurrentTime. Variable TestMetro is initialized to an initial performance note found within an interval plus or minus R from the theoretical beat. Now a performance time event within the theoretical beat is sought from the input EventTable at block 242. A program loop begins searching the EventTable. If a performance event lies within an interval I, at block 243, from the calculated beat or the auto metronome note, that performance event is designated as a 'beat' and its time Q is stored into NextBeat, and the CurrentTime is entered into the BeatTable 226. If none is found, then the automatic metronome note is used, at block 251.

There are several factors that influence the choice of the 'beat' note and are collectively calculated into a factoring value I. These factors are processed by 'weighting' factors from a table of values which are entered via a set of inputs. Each input will influence calculations made on the choice of one performance event over another. Some of the possible factors are MIDI channel priority 244, lengths of notes 245, and the presence of chords 246. Other influences on beat evaluation are 'shift' factors 247 before and after the beat which can compensate for 'incorrect' performance. All of these factors may be included in the beat choice to greater and lesser degrees depending on input values. In the final step, the variable Nextbeat 250 is determined in preparation for the next iteration of the main processing loop and then set BeatTable=CurrentTime, at block 249. In general, the standard scaling calculations provide independence of tempo from the process of determining relative proportional beat divisions. For example, if the same piece was played at two tempos, one much slower than the other, the MIDI-to-notation process will produce the same set of relative proportions of the beats and hence the same notation. In the slower tempo the number of clock ticks would be much greater as notes are held for longer durations.

In FIG. 17(c), the routine for building pages and staves or, specifically, building 'voices' associated with a staff, is now a process of converting the set of timed events using the filled-in BeatTable 226 into relative proportions and, hence, relative rhythm codes. This can be accomplished by the following method. First, a count is made at block 252 of the number of events in the beat being processed. Then, the lengths of each of the beat's events are stored, at block 253, into a table EventLengths 252A. The event note lengths are then converted, at block 254, into a series of proportions Pr and are then matched with proportions in a library PropList 255. Once these proportions are known, a further mapping process GetRhyCodes, at block 256, returns relative rhythm codes, at block 257, which are stored into staff data structures 258 that in turn belong to pages. These pages are now available to be used for displaying or printing using Beat Processing, or sound production via playing functions.

Scanning Printed Music to Relative Rhythm Codes

The existing base of printed sheet music can also be converted to relative rhythm codes so that the converted music data can be used for reprinting, revised arrangements, outputs in different forms or through various electronic hardcopy devices. Referring to FIG. 18A, the process of scanning printed music notation and converting the scanned input to relative rhythm codes, pitch data, and other musical symbols, begins with first capturing the sheet of music as a bit image 260, e.g., a gray scale image using standard scanning techniques and devices. An enhancement process may be performed, for example, using spatial domain methods which directly manipulate pixels in an image, to facilitate later pattern recognition, reduce computations, remove noise or excess errata, and simplify line segments. Segmentation at block 261 is used to identify all objects by comparisons with a library 263 of encoded objects. These objects from the Library are the lowest level recognizable structures. Lists of all identified objects are kept in ordered form corresponding to spacial occurrences and thus there are musical links between objects due to proximity. Some of these lower level objects are total entities and are identified as complete musical symbols, while others such as 'beat figures', e.g., rhythms containing beams, stems, flags, etc., are comprised of multiple low level objects which together describes a more complex object class, such as a group of four 1/16th notes in 4/4 time.

Next a page model or framework is built at block 262 to determine the basic layout of the page. Here, identification takes place of all important 'areas', i.e., systems and staves as well as meter. Data structures 264 are then initialized to prepare core storage for the receipt of data when musical structures are deciphered. Pitch is identified via reference to staff lines and a list of pitches is produced at block 266. The next level of recognition takes place as the objects identified earlier are then grouped or associated together to analyse more complex objects, at block 267, such as 'musical beat figures'. This is the beginning of identification of a rhythmic class of objects representing a beat or group of beats associated together via beams or notehead types. A beat context is determined at blocks 268–269 to initialize data structures that begin symbol identification for the given meter. The beat group (which could actually be comprised of more than one beat, e.g., a half note) is now known. Further refinement at block 269 of deciphering rhythmic details such as rest symbols, the number of beams (if any) in the beat, stems, notehead types, etc., are all determined. Once these details are found, then the counting of main and subdivisions at blocks 270 and 271 can take place and the mapping to relative rhythm codes occurs. At this point the pitch and relative rhythmic data for the current beat is processed at block 272. Now that the beat is established, symbols 273 associated with the pitches and rhythms can be added to the evolving data structure. Once symbols and rhythms have been deciphered, the process of formatting 274 takes place to ensure proper interspacial relationships between all entities on the page.

There are two basic styles of formatting. One style will identify all objects and preserve the original spatial arrangements of these musical objects. The other will interpret musical data and then format according to internal principles and likely will alter the basic layout of the staves and pages while preserving the contents of the beats. In summary, at block 274 the formatting process takes place which will distribute music and symbols on pages into proper systems and staves. First, analysis must be done on the music to determine its polygonal 'outline' to find the minimum space (to avoid symbol collisions) required for each beat of music. Similarly, all symbols including ties, slurs, articulations, dynamics, etc., must be found or analyzed to determine their minimum space required. Next, high level formatting takes place which will determine bar placement relative to the page. This is the basic layout of the pages which will include whether rests occur at the bottom right corner on the right hand page or if there is sufficient music to fill an entire page. Using different algorithms depending on musical styles, various densities of musical/symbol material are tried until one or more optimal fits are determined. Once high level formatting is completed, then the middle to low level formatting takes place to enforce final details and avoid any symbol collisions. Basically the goal is to evenly distribute entities for the most pleasing aesthetic effect. Output processes including display 275, storage 276, and printing 277 are now possible. At module 278, sound production is now possible by conversion to MIDI codes at block 273A. It would also be possible to merge this newly converted MIDI codes into other existing MIDI streams at block 279.

Scanning—Finding Staff/System Locations

Referring to FIG. 18(b), for a given page, the ScanCursor is moved to the top of the page at block 290, and set X to position ScCursXval. The sampling cursor ScanCursor (of N width) is then moved downward until the first set of five lines is found at block 294. Partial outlines of staves are found by seeking the surrounding greatest whitespace at block 295 around targeted staff objects. Staves are the largest continuities and are surrounded by the largest areas of white space. The target staff objects are located and the actual staff lines are then sought. Staff lines are defined as continuities of a certain length MinStaffSegment progressing in the horizontal direction. The MaxStaff and MinStaff positions are located at block 296 which are the highest and lowest lines of the staff. Intersecting symbols are checked at block 297 to ensure that an actual staff has been located.

Once the highest and lowest lines of the staff are verified, the middle line is found at block 299 by dividing the space by 2, which should give a reasonably close value for the middle line of the staff. At block 300 the X and Y parameters of the staff are stored into structure StaffStruct 292. This process is repeated for all remaining staves gradually filling in StaffStruct.

The next stage is to determine staff relationships, that is, to find musical system organization. The sampling cursor ScanCursor is moved to the left end of the now known staves. Using similar Line algorithms, only now for the vertical detection, any straight vertical line brackets are found at block 301. If found, the bracket end points MaxBrackY and MinBrackY are stored at block 303, and StaffStruct is parsed for staff locations to determine the staff relationships, at block 302A, relative to values MaxBrackY and MinBrackY of the vertical bracket. If no vertical brackets are found, the next step in the recognition process is seeking curved bracket types at block 302. Once located, detection of the curved bracket and its maximum and minimum Y points will determine staff groupings through parsing structure StaffStruct at block 302A. This is reiterated until the sampling cursors reach the bottom of the page at block 300A. At this point StaffStruct should be completed. Other variables, such as the widths of the staves, interstaff spacings, margins, number of systems and staves, could be filled into structure StaffData 293. Using both StaffStruct and StaffData, the processing builds page structures representing the given staves and page/staff descriptions. These complex structures would contain all coordinate information, including all rectangles identifying locations of every staff, as well as the content StaffData. This would provide a flexible framework on which to begin further processing of other musical symbols for continuing the printed music notation recognition process.

Scanning—Rhythm and Pitch Analysis

In FIG. 18(c), low level objects are linked together to form class compound 'Beat Figure' objects. Within each Beat Figure, the lower level objects are used for rhythm objects, i.e., beams, stems, flags, noteheads, etc., and produce output table RhyBeatObjects for each beat, and each RhyBeatObjects structure is stored into an indexed list 327A. Using StaffStruct, a series of RhyBeatObjects beat structures is related to staff organization, thus dividing beat streams into 'Parts'. Analysis can be conducted on every 'Part' on a beat by beat basis. First, a RhyBeatObjects beat structure is retrieved at block 328. This structure would contain a list of all identified lower level objects such as beam, stem, and notehead information. Notehead types would be identified first at block 329. Then all other basic low level musical/graphical objects are identified at blocks 330-333, i.e., stems, flags, beams, rests, dots, and appropriate flags are set at block 334 (Nfl, Sal, Ffl, Bfl, Rfl, Del) to indicate the presence of each. For each of these classes of graphical objects, the appropriate attributes for each are determined and stored in structure RhyBeatLogical 335 for every event. The following is the structure definition for RhyBeatLogical which would store the logical attributes of the various graphical objects which together comprises a single beat of music.

| Event Number from 0 to N |
|---|
| Notehead |

| -continued |
|---|
| Event Number from 0 to N |
|    status |
|    midi pitch value |
|    type of notehead |
|       filled ellipse |
|       empty ellipse |
|       empty ellipse with additional |
|          lines |
|    X,Y position |
|    accidental |
|    ObjLibIndex (index of object within library |
|         of known objects) |
| Stems |
|    status indicates presence of the current object |
|    X,Y |
|    ObjLibIndex |
| Tuplet Numbers |
|    status |
|    values i.e. 3 as in a triplet |
|    X,Y |
| Beams |
|    status |
|    number of beams associated with each |
|    stem and hence notehead |
|    X,Y |
|    ObjLibIndex |
| Flags |
|    status |
|    number of flags associated with each |
|    stem and hence notehead |
|    X,Y |
|    ObjLibIndex |
| Dots |
|    status |
|    number of dots associated with each |
|    notehead |
|    X,Y |
|    ObjLibIndex |
| Rests |
|    status |
|    type of rest i.e. 1/128, 1/16, ⅛th rest |
|    X,Y |
|    etc. |

When the RhyBeatObjects beat structure has been analyzed and transformed into a series of RhyBeatLogical structures which now describe the attributes of the beat in logical terms, analysis for main and subdivisions can begin. The series which is terminated by terminator BeatTerm is parsed to determine the relative rhythm codes. In a loop all events are counted. If the event count=1, the notehead type is found. If the notehead has no stem, then a whole note is detected at block 336. The Input=A" is set and the rhythm codes are looked up. Otherwise, the notehead is given a stem, i.e., half note, as indicated at block 336. The input is set accordingly and lookup continues. If (Bfl) is set, i.e., beams are present at block 337, then the RhyBeatLogical series for the beat is parsed at block 338, and the beam number is extracted and stored into table BeamVals 339. If a rest is present, the beamvalue equivalent is entered and stored into BeamVals.

This table BeamVals is now processed to determine the main and subdivisions of the beat 340. This is accomplished by processing groups containing similar beam numbers and by using relevant tuplet values and the current meter. This data would be used as input to a lookup table containing the notation for individual rhythmic events that map to beat division values in the current meter. Lookup step BmvalConvert() at block 341 consults a table of proportions and returns a set of codes which are stored into buffer RelRhyCodesBuffer 342. Other non-beamed rhythms are processed at block 337A. These types of rhythms would include all types of rests, e.g., quarter, whole and half rests, and single beat rhythms, e.g., quarter notes, and rhythms using flags. This class of rhythm is simpler to detect as each element of the beat exists as a separate symbol entity.

For pitch analysis, pointers are set to the current staff being processed. Symbol lookup for the staff in SymList determines what clef is present, at block 343, for the staff to establish a pitch reference. The series RhyBeatLogical 327B is then parsed for pitch locations at block 344. Given the clef and the origin of the staff from analysis StaffStruct 292 in FIG. 18(*b*), and the X,Y from the current RhyBeatObjects structure, the function PitStaff() at block 345 yields the pitch name and its logical value. At block 346, the element of the RhyBeatObjects structure, referred to as an 'accidental', indicating a symbol associated with the pitch notehead, modifies the resultant pitch code P by 1 or more semitones, as shown at block 347. Pitch code P is stored into a buffer PitchBuff 348 for later processing with the rhythm of the current beat. The series RhyBeatLogical is continually parsed for multiple notes in the same event, i.e., a chord, and then moves to subsequent pitch events. Upon reaching the end of RhyBeatLogical signalled by the terminator, the RelRhyCodesBuffer and PitchBuff are now ready to be used as input to Beat Processing or simply stored into a staff/voice data structure.

Scanning—Formatting

Once all parts containing relative rhythm and pitch codes are created, the formatting process shown in FIG. 18(*d*) is invoked. This formatting process is controlled by flag Formatflg. The formatting flag with a value of FormatFlg=1 at block 350 signals that the format process would redistribute musical beats and associated symbols across multiple pages according to internal algorithms. If FormatFlg=2, then the musical beats would preserve the original layout of the input pages, as indicated at block 351. At this point in the process, it is assumed that all parts have been filled with musical beat data and their associated symbols. Further, all staff and system symbols and text have also been parsed and organized into page-oriented data for storage.

The following is a description of how BusyBeat structures at table 351A are used to determine the formatting of minimum beatwidths and hence the general layout of bars within pages. For each system on a page, the formatting routine counts at block 353 the number of notes and rests on each staff in the system, then, by calling a pitch processing routine, counts the number of accidentals at block 354 in each staff. For each beat on the staff, an entry is made in an array, summing the notes and accidentals as described above. Other symbols have properties which also require horizontal space on the staff and are also counted at block 355. Some of these symbols would be meters, key signatures, double barlines, barlines, etc. All of these symbols would be marked so as to be included in all horizontal beat distribution calculations.

All entities and symbol types are used to compute the total "events" on the staff at block 356, i.e., events=notes+accidentals+symbols. Taking each beat, the vertical direction is parsed at block 357 for the 'busiest' beat of music and that busiest beat is stored at block 358 in the Busybeat array 351A. A minimum space, equal to Factor * NoteXDimension is allocated at block 359 for each event in the BusyBeat, and the minimum space required by the events on the staff is computed. If the space required by the music is greater than the amount of space available on the staff at block 360, a bar of music is moved from each staff in the system and all bars are shifted, and the computation is performed again, until sufficient space is available. If, on the other hand, the amount left over after allocating space for the events is greater than Factor*NoteXDimension at block 362, a bar of music is added to each staff in the system, until the remaining space is less than that.

Other types of possible formatting include non-proportional (the previous is proportional) where spaces between notes are a function of the duration of the note. Another possible step is to use the BusyBeat array to generate representative rectangle and polygons and to manipulate these higher level figures to achieve a general layout of all the pages before dealing with finer formatting details. This would be an efficient method of doing general layout. Symbol Context Formatting at block 364 involves complex rules and tables encoded in very compact form which describe many different symbol relationships and contexts. Weights SymWeights are used for setting proportions within given spaces, and InterObjSpace are rules describing relative spaces. These relative spaces determine distances between musical symbolic objects. Therefore classes of objects, i.e., Articulation, Dynamics, N Point Symbols (symbols with 1 origin), N point Symbols (symbols with multiple origins), etc., all contain weighting factors which determine positioning within a context compiler process SymPosition(). The weights show the association of objects, such as an articulation with a notehead, while there is a general 'dispersement of space' between all musical objects. This type of scheme would allow automatic placement of symbols in a musically meaningful manner.

Single Stream Pitch and Rhythm Codes

As previously described in the preferred system of the invention, relative rhythm coding uses separate rhythm and pitch streams of data to describe a complete beat of music in relative terms. An alternative technique would be to merge the rhythm and pitch streams into a single integrated stream to describe the beat. For example, a structure representing a beat of music could be constructed as follows:

EventRecord0:

A        B        C

[RhyException . . . ], Count¦RhyType, ([PitException],

D

PitchNo), . . . ,

. . .

E

BeatTerminator

In the above alternative relative rhythm coding format, the [RhyException . . . ] represents an optional set of one or more exception codes which serve as controls on rhythmic notation details, e.g., stem direction. The Count represents the count of the number of the pitches in the event (chord), and the RhyType represents the relative rhythm code which is associated with the Chord event. The Count and the RhyType are associated together as it would be convenient to encode them as a single unit of data. This association of Count and RhyType is not mandatory. Another possible arrangement would be to separate Count and RhyType and place rhythm exceptions adjacent to RhyType. The PitException . . . ] represents an optional set of one or more exception codes which serve as controls on pitch notation details, e.g., sharp or flat. The PitchNo is a pitch represented by a code in standard semitones of a scale over several octaves. There would be N PitchNo's for Count=N. The structure is flexible as there can be any number of RhyExceptions and PitExceptions. Further, there can be any number of PitchNo's as determined by Count.

All structures 'A, B, C, D' comprise an 'Event Record' and additionally, there can be any number of Event Records which are terminated by a single Beat Terminator 'E'. The essentials of the rhythm code are identical to those characteristics as described earlier. The difference here is that there is a single integrated pitch and rhythm stream of data, rather than the two pitch and rhythm code streams. This form of music data representation would make storage very compact, and secondly, the rhythm and pitch events are directly associated with each other and ensures correct alignment of pitch and rhythm elements. Programming to parse this integrated stream would work as follows. First, rhythm could be extracted and stored into a buffer by parsing the stream for rhythm codes and checking for the beat terminator. Pointers would be reset to the start of the beat record and a second pass would extract the pitch data into a buffer. Now there exists two separate streams of pitch and rhythm, as described previously for FIGS. 1-15. The Main Divisions and Subdivisions are then counted and beat processing would generate the notation for the music beat.

| Example: |
| --- |
| A) 2 Eighth Notes in 4/4, Main Division of 2:<br>    N0  Rhycode0,Pitch0, N1  RhyCode1,Pitch1 T<br>        N0 = pitch count<br>    Rhycode0 = relative rhythm code e.g. N<br>        Pitch0 = pitch code e.g. A natural<br>        T = beat terminator<br>B) 2 Eighth Notes in 4/4, Main Division of 2:<br>    With Pitch & Rhythm Exceptions:<br>    rx1,rx2,N0  Rhycode0,px1,px2,Pitch0,N1  RhyCode1,<br>    Pitch1 T<br>        rx1 = rhythm exception<br>        px1 = pitch exception |

Music Applications Using Relative Rhythm Codes

Music notation in relative rhythm and pitch coded form can be used in numerous useful musical operations. FIG. 19 illustrates how several generating modes can produce and interact with relative rhythm coded data. These operators are labelled Real Time Performance, Harmonic generation, Melodic generation, Music Permutations, Arrangement and Orchestration, and Manual Input. Each of these processes is considered a 'generating class' of operation in that they generate streams of pitch and rhythm data 410 and 411. Distinct from this 'generating process' is the class 'analyzing class' where distinctive relations are recognized and be reported or influence inputs to generators.

Real Time Performance 400 (see FIG. 17(a) for details) generates streams of real time MIDI data 406 which can be analyzed and converted to separate (or single) streams of pitch codes and relative rhythm codes. In addition, Manual Music Entry 405 also generates streams of pitch and rhythm data. Once formed, both pitch and rhythm data sets can be parsed by the 'analyzing' modules, e.g., the pitch analysis module 409 and the rhythm analysis module 412. Another generator, the Harmonic Generator 401, is a series of algorithms which, in response to user input regarding style, limiting factors, melodic sets, and rhythmic input, will generate a series of chords. Once basic chord sets are generated, then further operators such as rhythmic variation, and the addition of certain non-harmonic tones such as appogiaturas or passing tones, can be inserted for creating further variety. Also, style parameters can be input to influence the algorithms to yield different musical styles. Style is defined by certain characteristic rhythms and pitch patterns and, if applied statistically, can imitate certain musical conventions or idioms, e.g., jazz or Baroque style.

Another generator, the Melodic generator 402 is opposite to the Harmonic generator. First of all, a chordal progression must be made to establish the harmonic environment within which a melodic line can be formed. The harmonic content then largely determines the possible choices for melodic structuring and choice. In other words, the melodic pitch content reflects the underlying harmonic content. Emphasis here is on the choice of horizontal intervals which is the essence of melody.

The Music Permutator 403 acts as a tool to create permutations of given pitch and rhythmic patterns and to also allow exploration of multiple solutions in a given passage of music. These multiple solutions may be for the same or include overlapping time durations. For example, in an N bar composition, a sub section such as bars Q through R could be marked. Bars Q through R could then have as input M different solutions or alternate musical passages. A cursor could then select one of the M solutions T and this would be linked into the display list and thus shown on the staff or performed while all remaining M−1 solutions would remain invisible. When the current N bar composition is heard, it will include the T selected music for the marked bars Q through R. This process could be reiterated for any of the M solutions until a satisfactory solution is located. This Music Permuator would organize one of the most difficult problems in music composition.

The Orhestrator tool 404 distributes beats of music into arrangements from chamber to full orchestral scores. Input consists of N number of staves containing music. The music would then be marked for voicings, i.e., a continuous melodic line. A library of preset styles would then be checked to determine the method of distribution of the given input. The preset styles contain data on rhythm, pitch and possible instrumentations. Encoding of the preset styles could also contain guidelines on doublings where several instruments play the same pitches at some interval PitIntvl. Consideration is also given to playability at analysis module 408 of the proposed pitches on the given instrument.

All of the class generator tools produce pitch and relative rhythm codes which are passed to the Beat Processing program (see previous FIGS. 1-15) for generating music notation. The notation is viewable on a display 415 and can also be printed to hardcopy at 414 or converted to audio signals for aural production at 416. The pitch and rhythm analysis tools 409 and 412, respectively, can generate reports or output from pitch and rhythm codes created by all the generators. Reports for pitch would include a harmonic analysis which can be displayed in the form of letters and numerals or Roman numerals which are standard musical methods of harmonic representations, e.g., G major, G Dominant 7th, G7, V7 in C Major, etc. Pitch analysis output can also be fed back into the Harmonic Generator 401 and can be used for filling out incomplete chords when a certain harmony is implied by presence of a chord's subset of pitches. There also could be several harmonic solutions for the same set of notes. Rhythmic analysis 412 could report on repetitions of patterns, accent or beat emphasis or feed back to the generators. In general, both pitch and rhythm analysis can act as a feedback loop to influence generative processes to refine the qualities of the produced data.

Another analysis tool is the playability analysis module 408 which determines how a given set of relative rhythms, pitches and tempo would be played on a given instrument to measure the degree of difficulty. A database is collected on all standard instruments. This database would contain information about playability ranges, speed factors, notation and idiomatic features of the instrument. Algorithms would also simulate the hand and mouth to determine how the music would be performed by a human. The factor of speed is particularly important. Output from this module also feeds back to the generators and can influence their generative procedures.

Although the invention has been described with reference to certain preferred embodiments, it will be appreciated that many variations and modifications may be made consistent with the broad principles of the invention. It is intended that the preferred embodiments and all of such variations and modifications be included within the scope and spirit of the invention, as defined in the following claims.

I claim:

1. A computerized music data system comprising:
   (a) first input means for receiving pitch codes representing respective pitches which are to be designated as occurring in a series of basic music intervals of a music piece;
   (b) second input means for receiving relative rhythm codes for designating respective types of rhythm elements, including said pitches, as occurring in the basic music intervals of the music piece, wherein said relative rhythm codes include at least a series of main division codes, each of which represents a respective main division rhythm element designated as occurring in a basic music interval, and interposed demarcation codes each of which delimits a respective one of the basic music intervals of the music piece, wherein the relative rhythm codes for each basic music interval includes one or more main division codes and a demarcation code delimiting each said basic music interval;
   (c) third input means for selecting a desired interval duration value to be assigned to each of the basic music intervals corresponding to a selected time signature for the music piece;
   (d) computer means receiving the inputs of said first, second, and third input means and including: (1) programmed counting means for counting the number of main division codes designating respective rhythm elements occurring in each basic music interval, as delimited by a respective demarcation code, from said relative rhythm codes received through said second input means; and (2) programmed duration assigning means for assigning a fixed duration value to each of the main division rhythm elements in each respective basic music interval, said fixed duration value assigned to each main division rhythm element occurring in any given basic music interval being computed based upon said selected interval duration value assigned to the basic music intervals divided by the number of main division codes counted by said programmed counting means as occurring in said given basic music interval; and
   (e) relative rhythm data storage means operative in conjunction with said computer means for storing relative rhythm coded data based upon said pitch codes representing pitches for the respective rhythm elements, and said relative rhythm codes designating the rhythm elements including pitches occurring in the basic music intervals of the music piece, so that the corresponding fixed duration values can be assigned to the respective rhythm elements by said computer means.

2. A computerized musical instrument system according to claim 1, further comprising a keyboard having pitch keys for said first input means, said keyboard having relative rhythm coding keys for said second input means, said keyboard having control keys for said third input means, and a display for displaying musical notation thereon, wherein said output means is operated to generate an output of musical notation on said display corresponding to the pitches, relative rhythm codes, and selected time signature for the music piece entered on said keyboard.

3. A computerized musical instrument system according to claim 2, further comprising said keyboard having mode selection means for selecting any one of a plurality of data modes for said instrument system including a MIDI data mode, a MIDI conversion module for converting musical data entered by an operator playing on the pitch keys of said keyboard into a MIDI data format, and a synthesizer responsive to musical data in the MIDI data format for generating an audio output of synthesized sound, wherein in said MIDI data mode, said MIDI conversion module and said synthesizer operate to generate an audio output of synthesized sound corresponding to the pitch keys for the music piece played on said keyboard.

4. A computerized musical instrument system according to claim 3, wherein said computer means includes a relative rhythm coding module for coding musical data entered by pitch keys played on said keyboard and converted into MIDI data format by said MIDI conversion module in the MIDI data mode into relative rhythm data format of the corresponding pitch codes, relative rhythm codes, and time signature.

5. A computerized musical instrument system according to claim 4, further comprising storage means for storing musical data for said instrument system, wherein in said MIDI data mode, said relative rhythm coding module is operated to generate and store music data in relative rhythm data format in said storage means, said output means is operated to generate a display of music notation on said display, and said MIDI conversion module and synthesizer are operated to generate audio sound output for the music piece entered on said keyboard.

6. A computerized musical instrument system according to claim 2, wherein said output means includes means for selecting any one of a plurality of display modes for displaying musical notation on said display, including a musical notation display mode of musical notes, a pitch label display mode of notes having pitch labels, a separate code display mode of relative rhythm codes and pitches, a combined display mode of relative rhythm codes and musical notes, and/or a guitar tablature mode of guitar tablature notes.

7. A computerized musical instrument system according to claim 1, further comprising fourth input means for receiving an input of audio data, such as audio analog data or audio digital data representing an audio sample of a music piece, wherein said mode selection means includes means for selecting an audio data mode for processing said audio data input, and said computer means includes a relative rhythm coding module for converting said audio data input into relative rhythm data format of the corresponding pitch codes, relative rhythm codes, and time signature.

8. A computerized musical instrument system according to claim 2, wherein said pitch keys of said first input means are played by an operator to enter musical data for a music piece by inputting keypress codes in real time, said mode selection means includes means for selecting a real-time data mode for processing the real-time keypress data input, and said computer means includes a relative rhythm coding module for converting said keypress data input into relative rhythm data format of the corresponding pitch codes, relative rhythm codes, and time signature.

9. A computerized musical instrument system according to claim 1, further comprising a fifth input means for receiving an input of fixed music data representing pitches and fixed time durations associated with said pitches, wherein said computer means includes a relative rhythm coding module for converting said fixed music data input into relative rhythm data format of the corresponding pitch codes, relative rhythm codes, and time signature.

10. A computerized musical instrument system according to claim 9, wherein said fifth input means is adpated to receive fixed music data in a MIDI data format.

11. A computerized musical instrument system according to claim 9, wherein said fifth input means is adpated to receive fixed music data in a format of real-time keypresses.

12. A computerized musical instrument system according to claim 9, wherein said fifth input means is adpated to receive fixed music data in an audio sound format.

13. A computerized musical instrument system according to claim 9, wherein said relative rhythm coding module includes a processing loop for finding demarcations of the basic music interval in said fixed music data.

14. A computerized musical instrument system according to claim 1, wherein said output means includes means for storing the relative rhythm coded data in a page-oriented format.

15. A computerized musical instrument system according to claim 1, further comprising a sixth input means for receiving graphical notation data obtained from optically scanning music notation, said graphical notation data representing pitches and fixed time durations associated with said pitches, wherein said computer means includes a relative rhythm coding module for converting said graphical notation data input into relative rhythm data format of the corresponding pitch codes, relative rhythm codes, and time signature.

16. A computerized musical instrument system according to claim 1, wherein said output means includes a pitch and rhythm analysis module for analyzing selected characteristics of the relative rhythm coded data.

17. A computerized musical instrument system according to claim 1, wherein said output means includes a formatting module for formatting music notation output based upon said relative rhythm coded data for display or printing in a page-oriented format.

18. A computerized musical instrument system according to claim 1, wherein said first and second input means include an automatic generator for generating pitch codes and relative rhythm codes according to a predetermined algorithm.

19. A computerized musical instrument system according to claim 1, wherein said first and second input are combined for receiving pitch and rhythm codes combined in a single input stream.

20. A computerized musical instrument system according to claim 19, wherein said first and second inputs include a module for parsing the single input stream into separate streams of pitch codes and relative rhythm codes.

* * * * *